United States Patent [19]

Ten Kate

[11] Patent Number: 5,544,247
[45] Date of Patent: Aug. 6, 1996

[54] TRANSMISSION AND RECEPTION OF A FIRST AND A SECOND MAIN SIGNAL COMPONENT

[75] Inventor: Warner R. T. Ten Kate, Eindhoven, Netherlands

[73] Assignee: U.S. Philips Corporation, New York, N.Y.

[21] Appl. No.: 328,999

[22] Filed: Oct. 25, 1994

[30] Foreign Application Priority Data

Oct. 27, 1993 [EP] European Pat. Off. ............... 93203000

[51] Int. Cl.⁶ .................................................. H04H 5/00
[52] U.S. Cl. ................... 381/27; 381/2; 395/2.12
[58] Field of Search ................... 381/2, 5, 6, 14, 381/23, 22, 21, 27; 375/340, 241; 370/7; 395/2.1–2.39

[56] References Cited

U.S. PATENT DOCUMENTS

| | | | |
|---|---|---|---|
| 4,455,649 | 6/1984 | Esteban et al. | 381/29 |
| 4,622,680 | 11/1986 | Zinser | 395/2.38 |
| 4,896,362 | 1/1990 | Veldhuis et al. | 381/30 |
| 4,956,871 | 9/1990 | Swaminathan | 395/2.38 |
| 5,274,740 | 12/1993 | Davis et al. | 395/2.12 |
| 5,371,544 | 12/1994 | Jacquin et al. | 375/240 |
| 5,408,580 | 4/1995 | Stantner et al. | 395/2.14 |

*Primary Examiner*—Forester W. Isen
*Assistant Examiner*—Duc Nguyen
*Attorney, Agent, or Firm*—Laurie E. Gathman

[57] ABSTRACT

A transmitter for transmitting at least a first and a second main signal component is disclosed, having at least two input terminals for receiving the at least two input signals. The transmitter comprises multiplexer means for multiplexing the at least two input signals to a first input of matrixing means, and to an input of first bitrate reducing means. The first bitrate reducing means is for carrying out a data reduction step on the signal applied to its input and to supply a data reduced version to an output. Expansion means are present, having an input coupled to the first bitrate reducing means, for carrying out a data expansion on the data information applied to its input, so as to obtain a replica of the signal applied to the input of the bitrate reducing means at an output. Said output is coupled to a second input of the matrixing means. An output of the matrixing means is coupled to signal combination means via second bitrate reducing means. The output of the first bitrate reducing means is also coupled to the combination means. The signal combination means is adapted to combine the signals so as to enable the transmission of those output signals. Conversion means are provided between the input terminals and the inputs of the multiplexer means for converting the input signals into corresponding subsignals, such as subband signals. Further, a receiver for receiving the signals transmitted by means of the transmitter via the transmission medium, is disclosed.

The signals supplied by the combination means can be recorded on a record carrier.

25 Claims, 12 Drawing Sheets

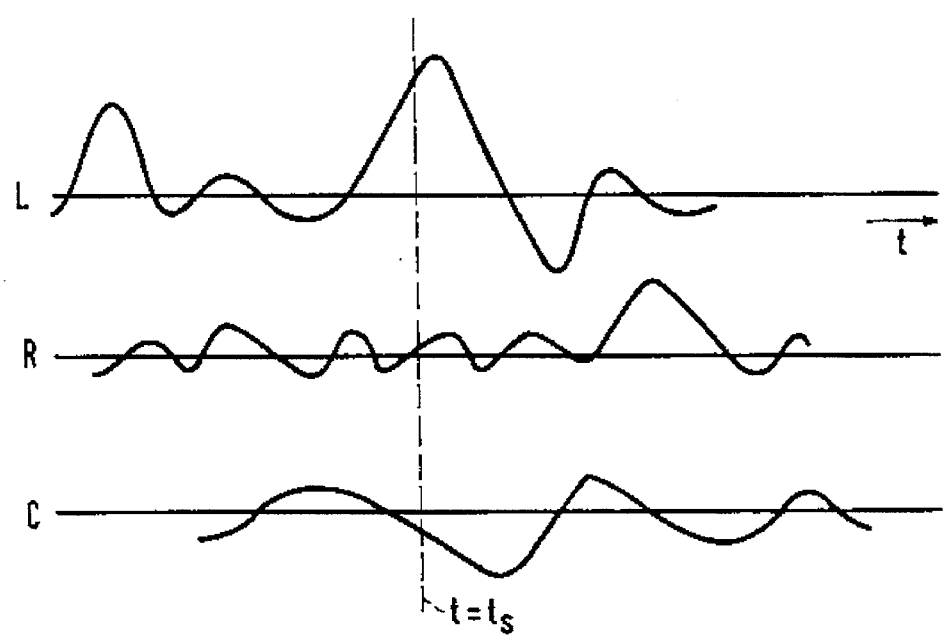
FIG. 2a
FIG. 2b
FIG. 2c
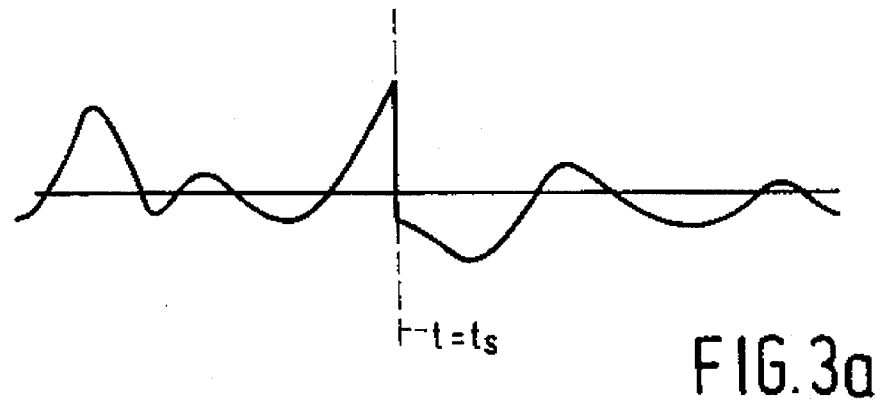
FIG. 3a
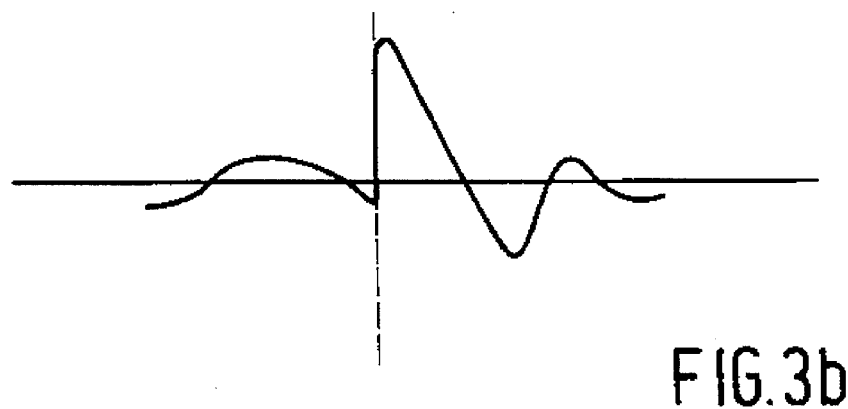
FIG. 3b

FIG. 15a  L 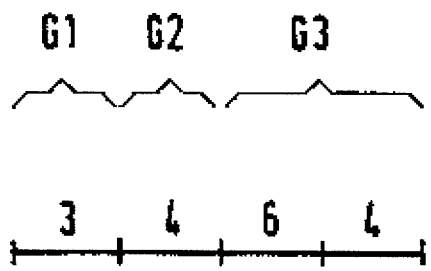
FIG. 15b  R 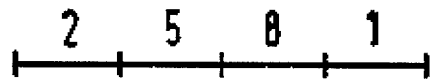
FIG. 15c  at 154 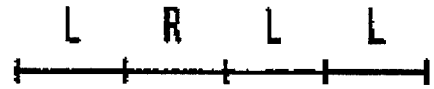
FIG. 15d  at 156 
FIG. 15e  at 14' 
FIG. 15f  mcs 1 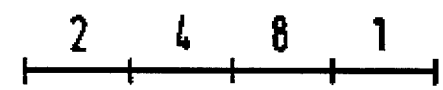

FIG. 16a  L  
FIG. 16b  R  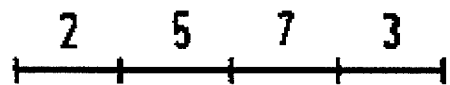
FIG. 16c  C  
FIG. 16d  at 154  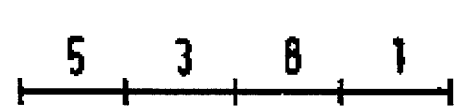
FIG. 16e  at 155  
FIG. 16f  at 156  
FIG. 16g  mcs 1  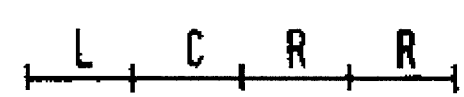
FIG. 16h  at 14'  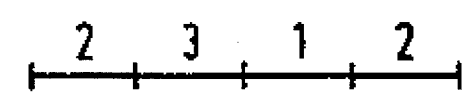
FIG. 16i  at 92'  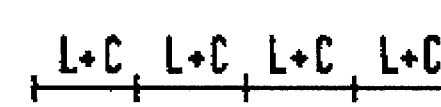

TRANSMISSION AND RECEPTION OF A FIRST AND A SECOND MAIN SIGNAL COMPONENT

FIELD OF THE INVENTION

The invention relates to a transmitter for transmitting at least a first and a second main signal component, in which a combined use of matrixing and bit rate reduction is carried out. The invention further relates to a receiver for receiving the signals transmitted by the transmitter, to compensation means that can be used in a transmitter and to a record carrier.

BACKGROUND OF THE INVENTION

Matrixing can be carried out when transmitting a first main signal component (the left hand signal component L of a stereo signal), a second main signal component (the fight hand signal component R) and an auxiliary component (a central signal component C), such that a first signal component $L_c$ is obtained which equals L+a·C and a second signal $R_c$ is obtained which equals R+a·C, and where the signals $L_c$, $R_c$ and C are transmitted. Upon reception by a standard receiver not being provided with a corresponding dematrixing circuit, the signal components $L_c$ and $R_c$ are used for supplying via two stereo loudspeakers to a listener. The listener is thus able to perceive the C component transmitted as well, although he has a standard receiver.

More sophisticated matrixing schemes are discussed in J.A.E.S., Vol. 40, No. 5, May 1992, pp. 376–382, as well as in the publication 'Matrixing of bitrate reduced audio signals' by W. R. Th. the Kate et al, in Proc. of the ICASSP, 1992, March 23–26, San Francisco, Vol. 2, pp. II-205 to II-208, documents (1a) and (1b) in the list of references.

Compression means for bit rate reducing a signal has been described in published European patent applications 457, 390A1 (PHN 13.328) and 457,391A1 (PHN 13.329), the documents (7a) and (7b) respectively in the list of references. Bit rate reducing the above signals L, R and C by means of the above compression means results in these signals being contaminated with quantization noise. The aim of the above compression means is to keep the quantization noise below the threshold of hearing. After transmission and receiving the quantized signals, the quantized signals are dequantized in the receiver, so as to obtain a replica of the signals L, R and C. The original signal components can be retrieved by dematrixing the dequantized signals $L_c$, $R_c$ and C. It has appeared that the received stereo signal is sometimes affected by quantization noise which has become audible. The above mentioned ICASSP publication has found a solution to this problem in that a prequantization and a corresponding dequantization is carried out on one one of the signal components. The transmitters described in the said publication however still suffer from a deterioration in the transmission characteristics.

OBJECT OF THE INVENTION

The invention has for its object to provide a transmitter including matrixing means and compression means which is capable of encoding a first and a second main signal component, and eventually at least one auxiliary signal component, in such a way that upon decoding in a receiver, the deterioration described above can be overcome.

The transmitter for transmitting at least a first and a second main signal component, therefore comprises at least a first and a second input terminal for receiving the first and second main signal component, at least a first and a second signal conversion means, each having an input coupled to a corresponding one of the input terminals and an output, the conversion means being adapted to convert an input signal applied to its input into M subsignals and to apply the M subsignals to its output, multiplexer means having at least a first and a second input coupled to the outputs of the at least two signal conversion means, at least a first and a second output and a control signal input, first compression means having an input coupled to the at least second output of the multiplexer means, the first compression means being adapted to carry out a data reduction step on the signal applied to its input in response to a first masking control signal and to supply a data compressed signal to an output, masking control signal generator means for generating the first masking control signal for the first compression means, the first masking control signal having a relationship with a masking threshold of the signal applied to the input of the first compression means, first expansion means having an input and an output, the input being coupled to the first compression means, the expansion means being adapted to carry out a data expansion on the signal applied to its input so as to obtain a replica of the signal applied to the input of the first compression means and to supply the replica to its output, matrixing means having at least a first and a second input, the first input being coupled to the first output of the multiplexer means and the second input being coupled to the output of the first expansion means, the matrixing means further having an output for supplying an output signal, the matrixing means being adapted to combine the signal applied to its first input and at least the signal applied to its second input so as to obtain the output signal, second compression means having an input coupled to the output of the matrixing means and an output, the second compression means being adapted to carry out a data reduction step on the signal applied to its input in response to a second masking control signal and to supply a data reduced output signal to its output, the masking control signal generator means being adapted to generate the second masking control signal for the second compression means, the second masking control signal having a relationship with a masking threshold of the signal applied to the first input of the matrixing means, instruction signal generator means for generating at least first and second instruction signals, the first instruction signal being generated for enabling an expansion in a receiver on the data reduced output signal of the first compression means so as to obtain a replica of the signal applied to the input of the first compression means, the second instruction signal being generated for enabling an expansion in the receiver on the data reduced output signal of the second compression means so as to obtain a replica of the output signal of the matrixing means, control signal generator means for generating the control signal for the multiplexer means, signal combination means for combining the output signals of the at least first and the second compression means as well as the first and second instruction signal and the control signal so as to enable the transmission of those output signals.

The transmitter for transmitting a first and a second main signal component and at least one auxiliary signal component therefore comprises at least three input terminals for receiving the at least three signal components, at least three signal conversion means, each having an input coupled to a corresponding one of the input terminals and an output, the conversion means being adapted to convert an input signal applied to its input into M subsignals and to apply the M subsignals to its output, multiplexer means having at least a first, a second and a third input coupled to the outputs of the at least three signal conversion means, at least a first, a second and a third output and a control signal input, first compression means having an input coupled to the at least third output of the multiplexer means, the first compression means being adapted to carry out a data reduction step on the signal applied to its input in response to a first masking control signal and to supply a first data compressed signal to an output, masking control signal generator means for generating the first masking control signal for the first compression means, the first masking control signal having a relationship with a masking threshold of the signal that is applied to the input of the first compression means, first expansion means having an input and an output, the input being coupled to the first compression means, the expansion means being adapted to carry out an expansion on the signal applied to its input so as to obtain a replica of the signal applied to the input of the first compression means and to supply the replica to its output, matrixing means having at least a first, a second and a third input, the first and second input being coupled to the first and second output respectively of the multiplexer means, and the third input being coupled to the output of the expansion means, the matrixing means having a first and a second output for supplying a first and a second output signal, the matrixing means being adapted to combine the signals applied its inputs so as to obtain a first output signal which has a relationship to a combination of the first main signal component and the at least one auxiliary signal component, and the second output signal which has a relationship with a combination of the second main signal component and the at least one auxiliary signal component, second and third compression means, each having an input coupled to the first and second output respectively of the matrixing means, and an output, the compression means being adapted to carry out a data reduction step on the signals applied to its inputs in response to second and third masking control signals and to supply data compressed first and second output signals to their outputs, the masking control signal generator means being adapted to generate the second masking control signal for the second compression means, and being adapted to generate the third masking control signal for the third compression means, the second masking control signal having a relationship with a masking threshold of the signal that is applied to the first input of the matrixing means, the third masking control signal having a relationship with a masking threshold of the signal applied to the second input of the matrixing means, instruction signal generator means for generating at least first, second and third instruction signals, the first instruction signal being generated for enabling an expansion in a receiver on the data reduced output signal of the first compression means so as to obtain a replica of the signal applied to the input of the first compression means, the second instruction signal being generated for enabling an expansion in the receiver on the data reduced output signal of the second compression means so as to obtain a replica of the first output signal of the matrixing means, the third instruction signal being generated for enabling an expansion in the receiver on the data reduced output signal of the third compression means so as to obtain a replica of the second output signal of the matrixing means, control signal generator means for generating the control signal for the multiplexer means, signal combination means for combining the output signals of the first, second and third compression means as well as the first, second and third instruction signals and the control signal so as to enable the transmission of those output signals.

The invention is based on the following recognition. The transmitter in accordance with the invention applies multiplexing on the at least two input signals prior to matrixing and bitrate reduction.

In the case that two signals (L and R) are transmitted, this results in either the L-signal component applied to the first input of the matrixing means and the R-signal component applied to the second input of the matrixing means or the L-signal component applied to the second input of the matrixing means and the R-signal component applied to the first input of the matrixing means.

In the case that only three signals (L,R and C) are transmitted, this results in (a) either the L- and R-signal component applied to the first and second input of the matrixing means, so that the C-signal component is applied to the third input of the matrixing means after prequantization and corresponding dequantization, (b) or the L- and C-signal component applied to the first and second input of the matrixing means, so that the R-signal component is applied to the third input of the matrixing means after prequantization and corresponding dequantization, (c) or the C- and R-signal component applied to the first and second input of the matrixing means, so that the L-signal component is applied to the third input of the matrixing means after prequantization and corresponding dequantization.

It is determined, for time equivalent signal portions of the at least three signal components, which combination of two signals from the at least three input signals supplied to the transmitter, when applied to the first and second input of the matrixing means, results in the maximum data reduction obtainable.

As a result, a switching over between signals applied to a certain input of the matrixing means as well as the bitrate reducing means can occur in the multiplexing means, for each subsequent signal block of time equivalent signal portions of the at least three signal components applied to the transmitter. This switching over, however, leads to switching transients in the signals obtained after reconstruction in the receiver, and thus to a deterioration of those signals.

It has been found that the fact that switching over between the signals took place in the wideband domain of said signals was the major cause of this deterioration. In accordance with the invention, switching now takes place in the subsignal domain, that is: after the signals have been converted into the subsignals (either transform coded signals or subband coded signals).

If the transmitter is capable of exchanging the subsignal components of the input signals before further encoding, the corresponding receiver should be capable of rearranging the subsignals in their original order after decoding and prior to reconverting to wideband signals such receiver is the subject of the claims directed to such receiver.

In the situation where the transmitter is in the form of an arrangement for recording the signals on a record carrier, a record carrier thus obtained is characterized in that the record carrier comprises the output signal of the signal combination means recorded in the track, the said output signal comprising the at least first, second and third control signal.

BRIEF DESCRIPTION OF THE DRAWINGS

The invention will be further described with reference to the following figure description, in which FIG. 3a shows the signal waveform as a function of time, as applied to one of the inputs of the matrixing means, FIG. 3b shows the signal waveform as a function of time, as applied to one of the compression means.

DESCRIPTION OF THE EMBODIMENTS

Figure 1A:
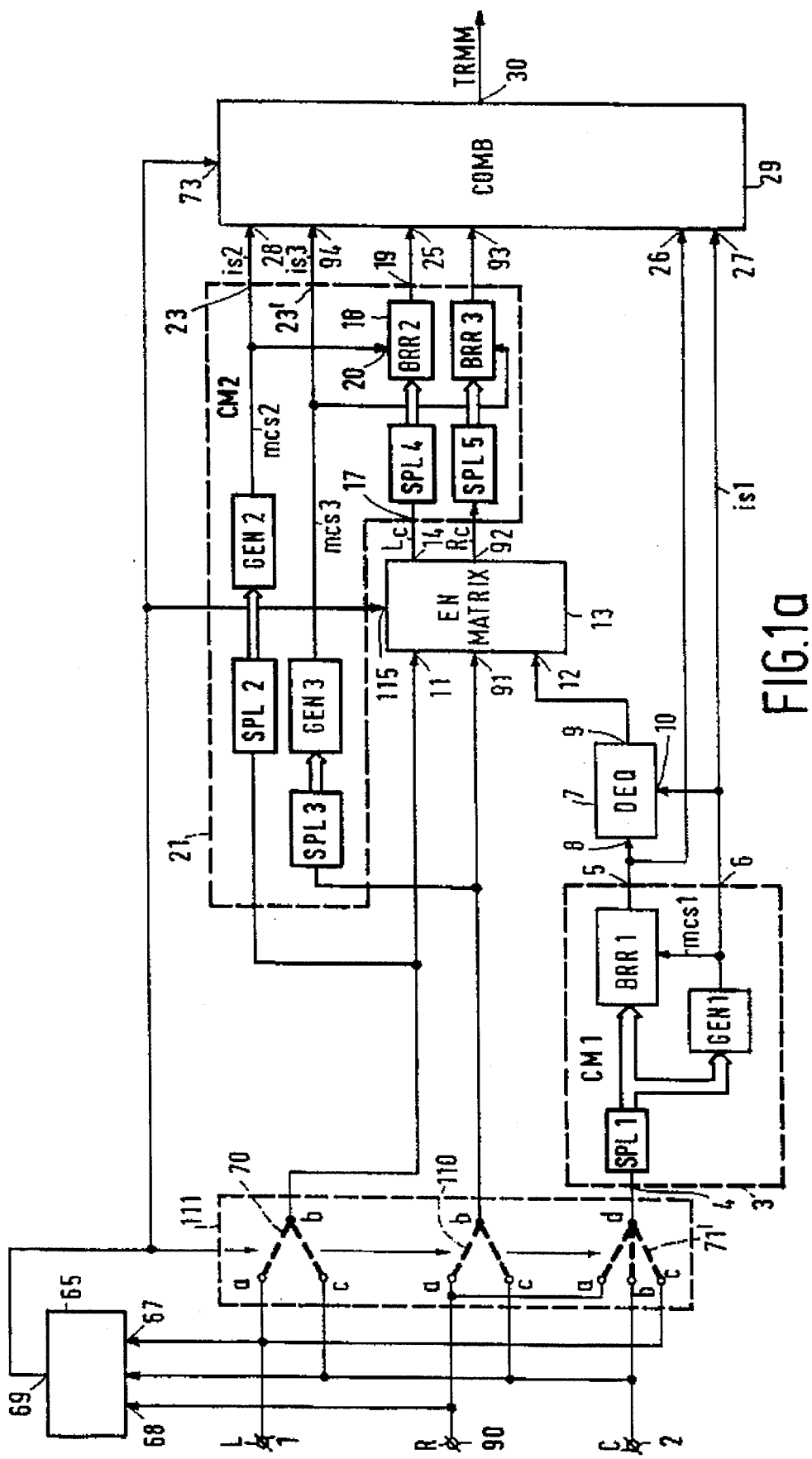
FIG. 1a shows an embodiment of the transmitter as described in FIG. 4a of a previous patent application.
Figure 1B:
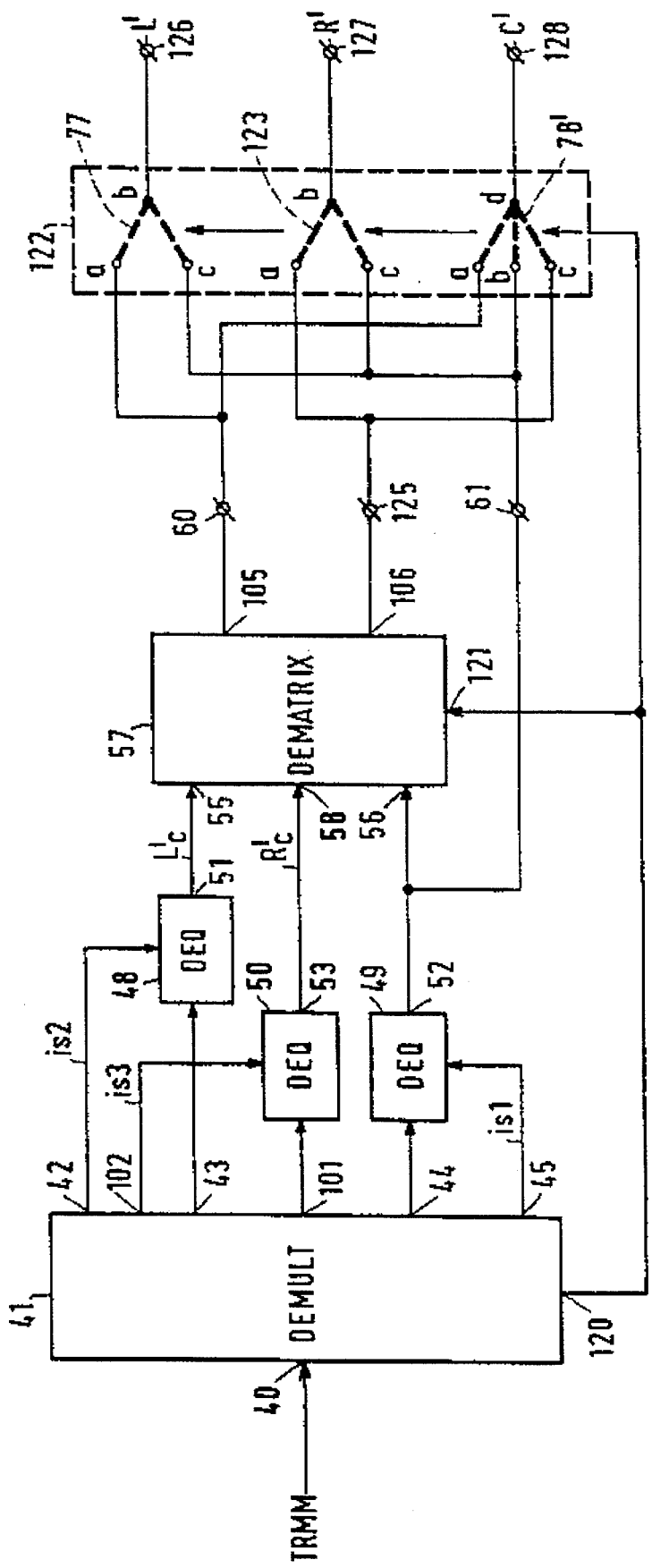
FIG. 1b shows an embodiment of a corresponding receiver, described in FIG. 4b of the previous application, FIG. 2 show signal waveforms as a function of time of the signals L, R and C.
Figure 4A:
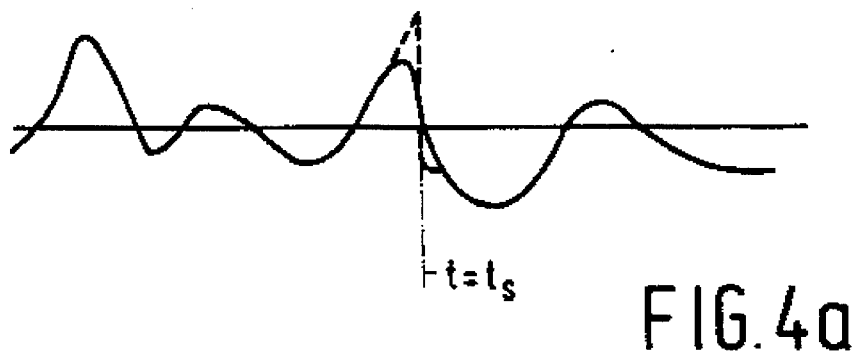
FIG. 4a shows the signal waveform of FIG. 3a after reception and expansion.

FIG. 1a shows an embodiment of a transmitter which is also described with reference to FIG. 4a in the earlier filed U.S. patent application Ser. No. 32,915 (PHQ 93-002), which is document (2) in the list of references. FIG. 1b shows the corresponding receiver, which is also described with reference to FIG. 4b in the said earlier filed U.S. patent application. The transmitter of FIG. 1a is meant to transmit a first and a second main signal component, such as the left and right hand signal component L and R of a stereo audio signal, and an auxiliary signal, as an example C, which is a central audio signal, via a transmission medium TRMM. A digitized version of the left signal component L is applied to a first input terminal 1 and a digitized version of the right signal component is applied to a second input terminal 90 and the central signal C is applied to the terminal 2. The terminals 1 and 90 are coupled to a-terminals of switches 70 and 110, incorporated in switching means 111. The terminal 2 is coupled to the b-terminal of the switch 71' in the switching means 111. Further, the terminal 1 is coupled to the c-terminal of the switch 71', the terminal 90 is coupled to the a-terminal of the switch 71' and the terminal 2 is coupled to the c-terminals of the switches 70 and 110.

The b-terminal of the switch 70 is coupled to a first input 11 of matrixing means 13. The b-terminal of the switch 110 is coupled to the (third) input 91 of the matrixing means 13, and the d-terminal of the switch 71' is coupled to an input 4 of first compression means 3 denoted by CM1.

In the first compression means 3, a bit rate reduction, namely in the element denoted by BRR1, is carried out on the signal applied to its input 4 in response to a first masking control signal mcs1, which is applied to a control signal input of the bit rate reducer BRR1. A possible embodiment of the compression means 3 has been extensively described in the above mentioned published European patent applications 457,390A1 (PHN 13.328) and 457,391A1 (PHN 13.329), ref (7a) and (7b). This embodiment comprises a subband splitter, indicated by SPL1, for subband splitting the input signal into a number of M subband signals occurring in consecutive subbands. For time equivalent signal blocks of q samples in each of the subbands, a bit allocation information $n_m$ is derived from the signal contents of the subbandsignals $SB_m$ in the various subbands. m runs from 1 to M. The bit allocation information is the masking control signal and is derived in the block denoted by GEN1, on the basis of the subband signals generated by the subband splitter SPL1. The subband signals obtained are supplied to the blocks denoted by GEN1 and BRR1. A quantization is carried out (in the block BRR1) on the q samples having a precision of at least 16 bit (as an example), in the time equivalent signal blocks of the subband signals in the M subbands in response to the bit allocation information $n_m$, such that the q quantized samples in a signal block of the subband signal $SB_m$ are now represented by $n_m$ bits. When the value of $n_m$, averaged over the corresponding M values for $n_m$ is, as an example, 4, this means that a data reduction of a factor 4 (16/4) has been obtained, if the samples have an original precision of 16-bit. The bit rate reduced signal (that is: the quantized subband signals) is (are) applied the output 5 of the compression means 3. Moreover, the bit allocation information $n_1$ to $n_M$, is applied to an output 6. The bit rate reduction carried out is based on the effect of masking, where a frequency component having a certain frequency and a certain amplitude results in a masking effect of a certain level for neighbouring frequency components. Neighbouring frequency components having an amplitude below the masking level are inaudible and need not be taken into account. The masking level in the various subbands relate to the bit allocation information, that is the values $n_1$ to $n_M$. This bit allocation information information should thus be considered as the first masking control signal mcs1, as already indicated above, which is generated by the masking control signal generator GEN1.

Generally, scale factors for (and from) each of the time equivalent signal blocks of q samples of the M subbandsignals are derived, so as to normalize the time equivalent signal blocks prior to carrying out the data reduction step in the block BRR1. At this moment, however, it will be assumed that the scale factors are derived in the generator GEN1, and that the masking control signal also includes the scale factors.

The compressed data supplied by the compression means 3 is applied to an input 8 of expansion means 7, denoted by DEQ. Further, the masking control signal mcs1 is applied together with the scale factor information as the first instruction signal to a control signal input 10 of the expansion means 7. In response to the instruction signal is1 applied to the input 10, the expansion means 7 realizes a dequantization on the quantized signals applied to the input 8, so as to generate a replica of the original signal component applied to the input 4. This means that for time equivalent signal blocks in the M subband signals, the samples are retrieved from the compressed data received via the input 8, and the q $n_m$-bit samples in the subbandsignal $SB_m$ are reconverted to 16-bit samples. The subband signals so obtained are combined in a subband combiner so as to obtain the replica of the original wideband signal component.

Subband splitters and corresponding subband combiners are extensively described in the prior art, see eg. published European patent application 400,755 (PHQ 89.018A), document (6) in the list of references.

It should be noted here, that the derivation of the bit allocation information (the masking control signal) in the generators GEN1, GEN2 and GEN3 need not be derived from the subband signals. It is also possible to derive the bit allocation information from the wideband signal, using a Fast Fourier transformation.

It should be further noted here, that the bitrate reduction as described above has been carried out in the subband signal domain, after having split the wideband digital audio signal into narrow band subband signals. It is however also possible to realize a bitrate reduction by carrying out a transform encoding of the wideband signal so as to obtain frequency components, on which the data reduction is carried out.

It should also be noted that the input of the expansion means 7 need not necessarily be coupled to the output 5 of the compression means 3, but can alternatively be coupled to an internal terminal in the bitrate reducer BRR1. The following gives an example of this.

Bitrate reducing the input signal in the bitrate reducer BRR1 means the following steps to be carried out on the 16-bit (as an example) samples in a signal block of the subband signal in subband m. First the q samples in the signal block are normalized in a normalization step, using the scale factor. Then a quantization step follows in which the 16-bit samples are converted to $n_m$-bit numbers. Supplying the $n_m$-bit numbers to the expander 7 requires that both the scale factors and the bitallocation information (the $n_m$ values) are supplied to the expander 7.

It is however also possible to supply 'rounded' samples to the expander 7, instead of their identifying $n_m$-bit numbers. These 'rounded' samples are still represented in the 16-bit precision. In this situation, the input of the expander 7 is coupled to an internal terminal inside the bitrate reducer BRR1 where the 'rounded' samples are available. Further, only the scale factors need to be supplied to the expander 7, in order to obtain a replica of the input signal of the bitrate reducer BRR1.

The output 9 of the expansion means 7 is coupled to a second input 12 of the matrixing means 13.

The matrixing means 13 generates first and second output signals $L_c$ and $R_c$ respectively at outputs 14 and 92 respectively, which satisfy the following equations:

$$L_c = L + a \cdot C$$

$$R_c = R + a \cdot C$$

In dependence of the position of the switches 70, 110 and 71' in the switching means 111, the following situations are possible.

(a) With the switches 70 and 110 being in the a-b position, and the switch 71' in the b-d position, the L signal is applied to the input 11 of the matrixing means 13, the R-signal is applied to the input 91 of the matrixing means 13, and the C-signal is applied to the input 4 of the bit rate reducer 3.

(b) With the switch 70 in the a-b position, the switch 110 in the c-b position and the switch 71' in the a-d position, the L-signal is applied to the input 11 of the matrixing means 13, the C-signal is applied to the input 91 of the matrixing means 13, and the R-signal is applied to the input 4 of the bit rate reducer 3.

(c) With the switch 70 in the c-b position, the switch 110 in the a-b position and the switch 71' in the c-d position, the C-signal is applied to the input 11 of the matrixing means 13, the R-signal is applied to the input 91 of the matrixing means 13, and the L-signal is applied to input 4 of the bit rate reducer 3.

It should however be noted that in all cases the matrixing means 13 generate the output signals $L_c$ and $R_c$ in accordance with the above formulae, irrespective of which signals are applied to its inputs 11, 91 and 12.

That means that, in the situation (a), given above, the C-signal in the formulae given above, is in fact the replica of the C-signal, which is applied to the input 12 of the matrixing means 13. In the situation (b) given above, the R-signal is applied to the input 12 of the matrixing means, so that the R-signal in the formulae given above is in fact the replica of the R-signal, supplied by the expansion means 7. In the situation (c) given above, the L-signal in the formulae given above, is a replica of the L-signal, which is supplied to the input 12 by the expansion means 7.

The output 14 of the matrixing means 13 is coupled to an input 17 of second compression means 21, denoted CM2. The second compression means are adapted to carry out a bit rate reduction on the signal $L_c$ in the element 18, denoted BRR2, under the influence of a second masking control signal mcs2 applied to a control signal input 20. The compression means 21 comprises second masking control signal generator means GEN2 for generating the second masking control signal mcs2, which is applied to the control signal input 20 of the bit rate reduction element BRR2. The masking control signal can again be in the form of bit allocation information values $n_1$ to $n_M$, as explained above. The masking control signal mcs2 is obtained from the signal applied to the input 11 of the matrixing means 13. The compression carried out on the signal $L_c$ can be identical to the way in which the bit rate reduction in the compression means CM1 is carried out. That means that a subband splitter SPL2 is present to supply the subband signals to the element GEN2, in order to derive the masking control signal mcs2 therefrom. Further, a subband splitter SPL4 is present so as to obtain the subband signals from the $L_c$ signal for the bit rate reduction step in the element BRR2. A data compressed signal is applied to an output 19 by the bit rate reducer 18. Moreover, a second instruction signal is2, which includes the second masking control signal mcs2 and further includes scale factor information, is applied to an output 23.

The compression means CM2 further comprises a generator GEN3, which functions in the same way as the generator GEN2, and which derives the masking control signal mcs3 from the signal applied to the input 91 of the matrixing means 13. Further, a bitrate reducer element BBR3 is present, which functions in the same way as the bitrate reducer BBR2, and which derives a data compressed output signal from the signal $R_c$, which data compressed signal is applied to its output. A subband splitter SPL3 is present so as to obtain subband signals for the generator GEN3 and a subband splitter SPL5 is present so as to obtain subband signals from the signal $R_c$, which subband signals are supplied to the bit rate reducer BRR3. The masking control signal mcs3 is applied to an output 23' as an instruction signal is3, together with scale factor information.

It is shown that the derivation of the two masking control signals mcs2 and mcs3 is realized separately in the two elements GEN2 and GEN3. It should however be noted that both masking control signals can be derived in a combined procedure out of the two signals applied to the inputs 11 and 91 of the matrixing means 13. Reference is made in this respect to document (7a), the published European patent application 457,390A1 (PHN 13.328).

It should further be noted that, in order to further reduce the bitrate in the second compression means CM2, it is possible to apply a stereo-intensity mode coding on time equivalent signal blocks of the corresponding subbandsignals in the first and second output signals of the matrixing means 13. A stereo-intensity mode coding of a stereo signal is extensively described in European patent application no. 402,973A1 (PHN 13.241), which is document (3) and European patent application no. 497,413A1 (PHN 13.581), which is document (4) in the list of references. It is even possible to apply the stereo-intensity coding on more than two signals.

The compressed signals $L_c$ and $R_c$ are applied to inputs 25 and 93 respectively of signal combination means 29. Further, the compressed signal present at the output 5 of the compression means CM1 is applied to an input 26 of the combination means 29. Also the instruction signals is1, is2 and is3 are applied to inputs 27, 28 and 94 respectively of the combination means 29.

The combination means 29 combine the compressed signals and the instruction signals (bit allocation information) so as to obtain a serial datastream that can be applied via an output 30 to a transmission medium TRMM.

Published European patent application 402,973 (PHN 13.241), document (3), extensively describes how compressed signals and bit allocation information can be combined so as to obtain a serial data stream of information. Another way of combining various signal components is by applying hidden channel techniques. Reference is made in this respect to the previously mentioned J.A.E.S. publication, document (1a).

The transmitter of FIG. 1a further includes calculation means 65. The calculation means 65 calculate three data reduction ratios. A first data reduction ratio which is a measure for the amount of data reduction realized by the first and second compression means CM1 and CM2 together, for the case that the first main signal component L would have been applied to the input 11 of the matrixing means 13, and the R signal component would have been applied to the input 91. In that case, the masking control signals mcs2 and mcs3 are derived from the signals L and R. The second data reduction ratio relates to the amount of data reduction realized by the compression means CM1 and CM2 together, for the case that the L signal component would have been applied to the input 11 of the matrixing means 13, and the C signal component would have been applied to the input 91. In that case, the masking control signals mcs2 and mcs3 are derived from the signals L and C. The third data reduction ratio relates to the amount of data reduction that would have been obtained by the compression means CM1 and CM2 together, for the case that the C signal component would have been applied to the input 11 of the matrixing means 13 and the R signal component would have been applied to the input 91. In that case, the masking control signals mcs2 and mcs3 are derived from the signals C and R.

The bit allocation information, derived in the two compression means CM1 and CM2 and discussed previously, is a measure for such data reduction ratio, in that the lower the values for $n_1$ to $n_M$, the higher is the data reduction ratio. The calculation means 65 is thereto capable of determining the bitallocation information $n_{11}$ to $n_{M1}$ for the left hand signal component L, capable of determining the bitallocation information $n_{1r}$ to $n_{Mr}$ for the right hand signal component R, and capable of determining the bitallocation information $n_{1c}$ to $n_{Mc}$ for the C signal. To that purpose, all three signal components are applied to inputs of the means 65. The calculation of the three sets of values $n_{11}$ to $n_{M1}$, $n_{1r}$ to $n_{Mr}$ and $n_{1c}$ to $n_{Mc}$ is thus carried out each time for time equivalent signal blocks of q samples of the subband signals of the three signal components L, R and C.

Three data reduction ratios (or values) are thus determined. A first one for the case that the first compression means CM1 compress the C signal component, and the second compression means CM2 compress the signals $L_c$ and $R_c$, and where the masking curves for the second compression means are derived from the L- and R-signal components. A second one for the case that the first compression means CM1 compress the R- signal component and the second compression means CM2 compress the signals $L_c$ and $R_c$, where the masking curves for the second compression means are derived from the L- and C signal component. A third one for the case that the compression means CM1 compress the L-signal component and the compression means CM2 compress the signals $R_c$ and $L_c$, where the masking curves for the compression means are derived from the R and C signal components.

If the first data reduction ratio appears to be the highest one, a first control signal is applied to an output 69. A first control signal generated by the means 65 indicates that the left and right hand signal components L and R realize the largest masking power, so that the two compression means CM1 and CM2 realize the largest amount of data compression. If the second data reduction ratio appears to be the highest one, a second control signal is applied to an output 69. A second control signal generated by the means 65 indicates that the left hand signal component L and the C signal component realize the largest masking power, so that the two compression means CM1 and CM2 realize the largest amount of data compression. If the third data reduction ratio appears to be the highest one, a third control signal is applied to an output 69. A third control signal generated by the means 65 indicates that the right hand signal component R and the C signal component realize the largest masking power, so that the two compression means CM1 and CM2 realize the largest amount of data compression. As a result, always the maximum channel capacity is available for the signal applied to the input 4 of the compression means CM1.

The first, second or third control signal is applied to the switching means 111 comprising the three switches 70, 71' and 110. In response to the first control signal, the switch 70 is switched in its position a-b, the switch 110 is switched in its position a-b and the switch 71' is switched in its position b-d, so that the L-, R- and C-signals are applied to the inputs 11, 91 and 12 of the matrixing means 13 respectively. In response to the second control signal, the switch 70 is switched in its position a-b, the switch 110 is switched in its position c-b and the switch 71' is switched in its position a-d, so that the L-, C- and R-signals are applied to the inputs 11, 91 and 12 respectively of the matrixing means 13. In response to the third control signal, the switch 70 switched in its position c-b, the switch 110 is switched in its position a-b and the switch 71' is switched in its position c-d, so that the C-, R- and L-signals are applied to the inputs 11, 91 and 12 of the matrixing means 13 respectively.

The output 69 of the calculation means 65 is further coupled to a control signal input 115 of the matrixing means 13. In response to the first, second or third control signal applied to the input 115, the matrixing means 13 generate the first and second output signals $L_c$ and $R_c$ in accordance with the formulae given above, irrespective of to which of the inputs 11, 91 and 12 the three signals L, R and C are applied. The control signal generated by the calculation means 65 is also applied to the input 73 of the combination means 29, so as to enable the transmission of the control signal via the transmission medium TRMM.

It should be noted that in order to generate the first, second or third control signal, the calculation means 65 have calculated three sets of bit allocation information, namely the values $n_{11}$ to $n_{M1}$, the values $n_{1r}$ and $n_{Mr}$ and the values $n_{1c}$ to $n_{Mc}$. The same sets of values have been determined in the generators GEN1, GEN2 and GEN3. Those generators can thus be in common for the calculating means 65, and the compression means CM1 and CM2.

FIG. 1*b* shows a receiver for receiving and decoding the compressed signals transmitted by the transmitter of FIG. 1*a* via the transmission medium TRMM. The serial datastream is applied to an input 40 of a demultiplexer 41, which splits the information in the serial datastream into the original quantized samples of the signal $L_c$, which samples are applied to an output 43, the original quantized samples of the signal $R_c$, which samples are applied to an output 44, the original quantized samples of the third signal transmitted, which is either the quantized L-, R- or C-signal, which samples are applied to an output 101, the first instruction signal is1, which is applied to an output 45, the second instruction signal is2, which is applied to an output 42 and the third instruction signal is3, which is applied to an output 102. The outputs 43, 44 and 101 are coupled to signal inputs of expansion means (dequantizers DEQ) 48, 49 and 50 respectively. The outputs 42, 45 and 102 are coupled to control signal inputs of the quantizers 48, 49 and 50 respectively, so as to enable the instruction signals to be applied to the dequantizers. The dequantizers 48, 49 and 50 function in the same way as the dequantizer 7 in the transmitter of FIG. 1*a*. The dequantizer 48 thus generates a replica $L_c'$ of the signal $L_c$, which is supplied to an output 51. The dequantizer 49 thus generates the replica $R_c'$ of the signal component $R_c$, which is supplied to an output 52. The dequantizer 50 thus generates a replica of the quantized third signal, that is either a replica L' of the signal component L, or a replica R' of the signal component R, or a replica C' of the signal component C, which replica is applied to the output 53. The outputs 51, 52 and 53 are coupled to inputs 55, 56 and 58 respectively of a dematrixing means 57.

The demultiplexer means 41 has an additional output 120 for supplying the first, second or third control signal generated by the calculation means 65 of the transmitter of FIG. 1*a*. The dematrixing means 57 has an additional control signal input 121 which is coupled to the output 120 of the demultiplexer means 41. If the control signal applied to the control signal input 121 is the first control signal, this means that the signal applied to the input 56 of the matrixing means 57 is the replica of the C-signal. In that case, the receiver functions so that replicas of the L- and R-signals are applied to outputs 105 and 106 respectively, and thus to terminals 60 and 125 respectively. If the control signal applied to the control signal input 121 is the second control signal, this means that the signal applied to the input 56 of the matrixing means 57 is the replica of the R-signal. In that case, the dematrixing means 57 functions such that replicas of the L- and C-signals are applied to the outputs 105 and 106 respectively, and thus to the terminals 60 and 125 respectively. If the control signal applied to the control signal input 121 is the third control signal, this means that the signal applied to the input 56 of the matrixing means 57 is the replica of the L-signal. In that case, the dematrixing means 57 functions such that replicas of the C- and R-signals are applied to the terminals 60 and 125 respectively.

The receiver further comprises controllable switching means 122 comprising switches 77, 123 and 78'. In response to the first control signal applied to the switching means 122, the switch 77 is switched in the position a-b, the switch 123 is switched in the position a-b and the switch 78' is switched in the position b-d, so that the replicas L', R' and C' are applied to the terminals 126, 127 and 128 respectively. In response to the second control signal applied to the switching means 122, the switch 77 is switched in the position a-b, the switch 123 is switched in the position c-b and the switch 78' is switched in the position c-d, so that the replicas L', R' and C' are again applied to the terminals 126, 127 and 128 respectively. In response to the third control signal applied to the switching means 122, the switch 77 is switched in the position c-b, the switch 123 is switched in the position a-b and the switch 78' is switched in the position a-d, so that the replicas L', R' and C' are again applied to the terminals 126, 127 and 128 respectively.

It will be clear that the dematrixing means 57 and the switching means 122 can be combined into one combined dematrixing means having three outputs, which supplies the first and second main signal components L' and R' to its first and second outputs and the auxiliary signal C' to its third output in response to the control signals applied to the combined dematrixing means.

From the description of the transmitter of FIG. 1*a*, it can be seen that the switching between the three signal components take place in the wideband domain. This has the following disadvantage.

FIG. 2 shows an example of waveforms of the three signals L, R and C as a function of time, applied to the terminals 1, 90 and 2 respectively of the transmitter of FIG. 1*a*. It is assumed that prior to the time instant $t=t_S$, a first control signal is generated by the calculation means 65. That is: the L and R signals are applied to the inputs 11 and 91 respectively of the matrixing means 13, and the C signal is applied to the input 4 of the compression means 3. It is further assumed that a third control signal is generated by the calculation means 65 after the time instant $t=t_S$. That means that the C signal is applied to the input 11 of the matrixing means 13, the R signal is applied to the input 91 of the matrixing means 13 and the L signal is applied to the input 4 of the compression means 3. FIG. 3*a* shows the waveform as a function of time of the signal applied to the input 11 of the matrixing means 13 and FIG. 3*b* shows the waveform of the signal applied to the input 4 of the compression means 3. As can be seen in both waveforms, a switching transient occur at the time instant $t=t_S$.

Figure 4B:
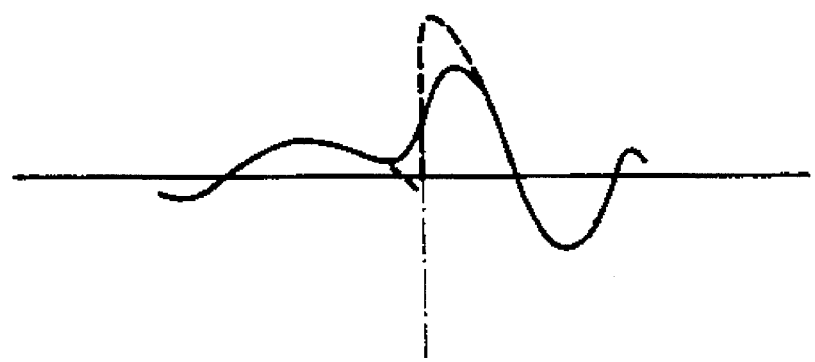
FIG. 4b shows the signal waveform of FIG. 3b after reception and expansion.
Figure 5A:
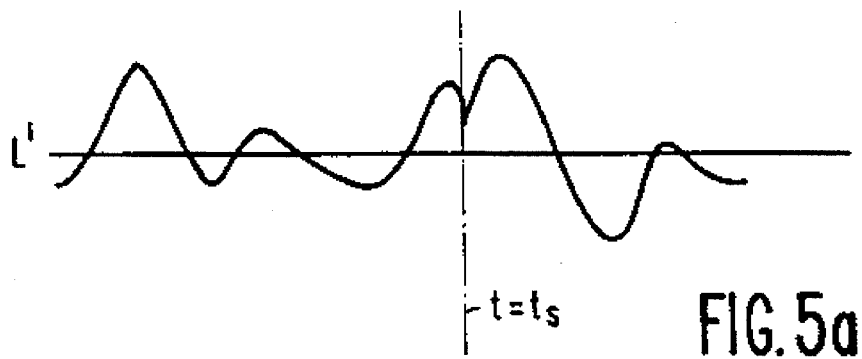
FIG. 5 shows the waveforms as a function of time of replicas of the signals L and C obtained after reception, expansion and reconstruction.
Figure 5B:
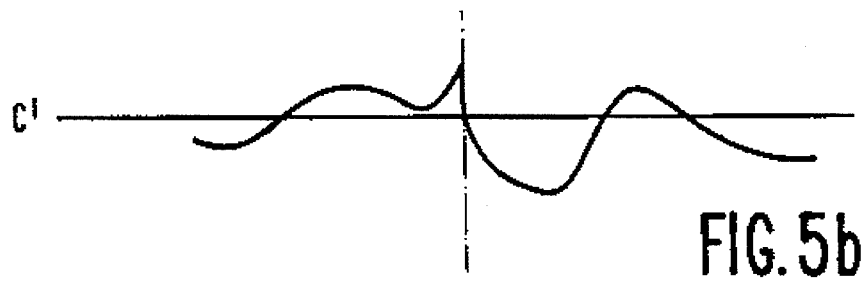

These transients have a high frequency content, and are encoded in the transmitter as if they belong to the original signal. As a result, the calculation of the masking control signals in the generators GEN1 and GEN2 will not be fully correct, as the masking effect in the high frequency range is overestimated, so that the transients at the output of the expansion means 48 and 49 in the receiver of FIG. 1b will be distorted and have a waveform as a function of time as shown in FIG. 4a and FIG. 4b respectively. As a result of the reconversion by means of the switching means 122, signals L' and C' appear at the output terminals 126 and 128, having a waveform as a function of time as shown in FIG. 5. The signals L' and C' of FIG. 5 differ quite significantly from the signals L and C respectively of FIG. 2, at the location of the switching instant at $t=t_S$.

Figure 6:
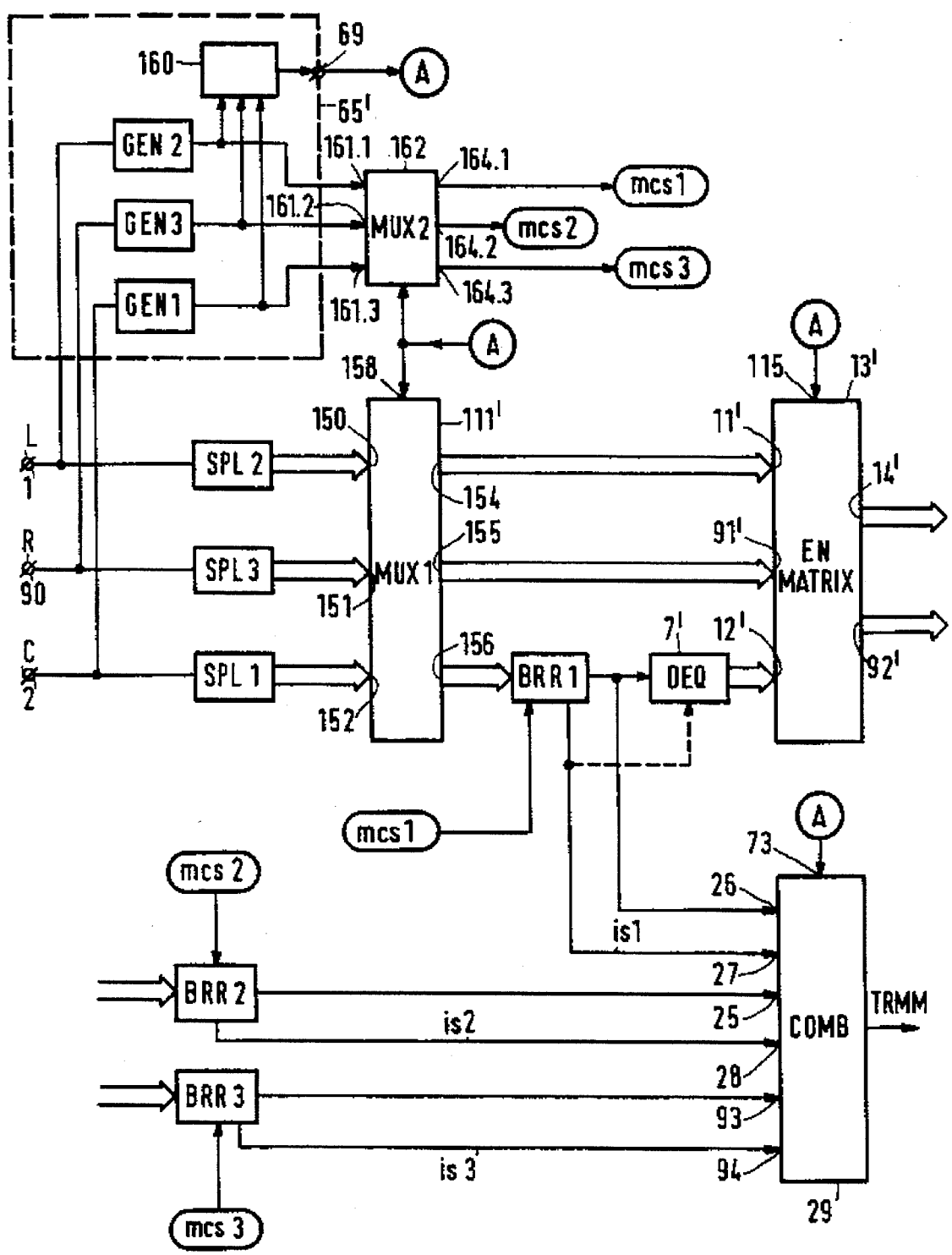
FIG. 6 shows a first embodiment of the transmitter.

A solution to this problem is given in FIG. 6. The solution is in fact based on the recognition that switching should take place in the subband signal domain, and not in the wideband signal domain. More specifically, the switching should take place at the boundaries of the signal blocks of q samples of the subband signals.

The transmitter of FIG. 6 has its input terminals 1, 90 and 2, to which the signals L, R and C respectively are supplied coupled to subband splitters SPL1, SPL2 and SPL3 respectively. The subband signals obtained are supplied to inputs 150, 151 and 152 respectively of a multiplexer 111'. The multiplexer 111' has the same function as the switching means 111 of FIG. 1a, except for the fact that it now multiplexes subband signals instead of wideband signals. Outputs 154 and 155 of the multiplexer 111' are coupled to inputs 11' and 91' respectively of matrixing means 13'. The matrixing means 13' has the same function as the matrixing means 13 of FIG. 1a, except for the fact that it now matrixes subband signals instead of wideband signals. The output 156 of the multiplexer 111' is coupled to an input of the bitrate reducing means BRR1, which has the same function as the bitrate reducing means BRR1 of FIG. 1a. The output of the bitrate reducing means BRR1 is coupled to the input of expansion means (DEQ) 7', as well as to the input 26 of the signal combination means 29. An output of the expansion means 7' is coupled to the input 12' of the matrixing means 13'. The expansion means 7' has the same function as the expansion means 7 of FIG. 1a, except for the fact that it does not include the subband synthesis filters so as to combine the subband signals into a wideband signal.

What has been said above in relation to the cooperation and the interconnection between the bitrate reducer BRR1 and the expander 7 of FIG. 1, is equally valid for the cooperation and the interconnection between the bitrate reducer BRR1 and the expander 7' in FIG. 6.

That means that the expander 7' can receive the fully encoded datareduced information form the bitrate reducer BRR1, in which case the expander 7' requires the bitallocation information as well as the scale factors. The input of the expander 7' can, for example, also be coupled to a terminal inside the bitrate reducer BRR1 where the only 'rounded' samples are available. In that case, the expander 7' only requires the scale factors. The supply of the scale factors and/or the bitallocation information to the expander 7' is only schematically given by means of the broken interconnection between the bitrate reducer BRR1 and the expander 7'.

Outputs 14' and 92' of the matrixing means 13' are coupled via bitrate reducing means BRR2 and BRR3 respectively, to the inputs 25 and 93 respectively of the combining means 29. The bitrate reducing means BRR2 and BRR3 have the same function as the bitrate reducing means BRR2 and BRR3 respectively in FIG. 1a.

Also calculation means 65' are present. The calculation means 65' function in the same way as the calculation means 65 in FIG. 1a, in that it also generates the first, second or third control signal at its output 69. This control signal is applied a control signal input 158 of the multiplexer 111', to the control signal input 115 of the matrixing means 13' and to the input 73 of the combining means 29, in the same way and for the same reason as shown and explained in FIG. 1a. The calculation means 65' is a little bit different from the calculation means 65 in FIG. 1a, in that the generators GEN1, GEN2 and GEN3, shown in FIG. 1a as included in the compression means CM1 and CM2, are now included in the calculation means 65'. The circuit diagram of the calculation means 65' in FIG. 6 shows that the first, second or third control signal generated at the output 69, is derived from the bit allocation information (masking control signals) derived from the three wideband signals L, R and C by means of the generators GEN2, GEN3 and GEN1 respectively in a unit 160. The masking control signals generated by the generators GEN1, GEN2 and GEN3 are supplied to inputs 161.3, 161.1 and 161.2 respectively of a second multiplexer 162. At outputs 164.1, 164.2 and 164.3 are masking control signals mcs1, mcs2 and mcs3 respectively available.

If the generators GEN1, GEN2 and GEN3 use a Fourier transform to obtain the masking control signals, those masking control signals only comprise the bit allocation information (the $n_m$ values). In that case, the scale factors in the various subbands will be derived in the various bitrate reducers (where the subband signals are available).

The masking control signal mcs1 is applied to the bitrate reducing means BRR1. If the masking control signal also includes the scale factors, it can also directly be applied to the input 27 of the combining means 29 as the instruction signal is1. The masking control signal mcs2 is applied to the bitrate reducing means BRR2. If the masking control signal mcs2 also includes the scale factors, it can also directly be applied to the input 28 of the signal combining means 29 as the instruction signal is2. The masking control signal mcs3 is applied to the bitrate reducing means BRR3 and if the masking control signal mcs3 includes the scale factors, it can also directly be applied to the input 94 of the combining means 29 as the instruction signal is3.

As can be seen in FIG. 6, it is assumed that the masking control signals only include the bitallocation information, so that the scale factors have been derived in the bitrate reducers BRR1, BRR2 and BRR3. Those bitrate reducers add the scale factors to the masking control signals to form the instruction signals. The latter are applied to the combining means 29. It is to be noted that the instruction signals may also contain other information besides the mentioned scale factors, for example, information related to the above mentioned intensity coding techniques may be contained in the instruction signals.

In response to the first control signal applied to the input 158, the multiplexer 111' is switched in such a position that the subband signals of the L-, R- and C-signals are applied to the inputs 11', 91' and 12' respectively of the matrixing means 13'. Further, the multiplexer 162 is switched in a such a position that the masking control signal generated by the generator GEN1 is the first masking control signal mcs1, the masking control signal generated by the generator GEN2 is the second masking control signal mcs2, and the masking control signal generated by the generator GEN3 is the third masking control signal mcs3.

In response to the second control signal, the multiplexer 111' is switched in such a position that the subband signals of the L-, C- and R-signals are applied to the inputs 11', 91' and 12' respectively of the matrixing means 13'. Further, the multiplexer 162 is switched in such a position that the masking control signal generated by the generator GEN3 is the first masking control signal mcs1, the masking control signal generated by the generator GEN2 is the second masking control signal mcs2, and the masking control signal generated by the generator GEN1 is the third masking control signal mcs3.

In response to the third control signal, the multiplexer 111' is switched in such a position that the subband signals of the C-, R- and L-signals are applied to the inputs 11', 91' and 12' respectively of the matrixing means 13'. Further, the multiplexer 162 is switched in a such a position that the masking control signal generated by the generator GEN1 is the second masking control signal mcs2, the masking control signal generated by the generator GEN2 is the first masking control signal mcs1, and the masking control signal generated by the generator GEN3 is the third masking control signal mcs3.

As already explained with reference to FIG. 1a, the matrixing means generates in response to the control signal applied to its control signal input 115, at its output 14' subband signals $L_{ci}$ and at its output 92' subband signals $R_{ci}$ which satisfy the following equations:

$$L_{ci} = L_i + a \cdot C_i$$

$$R_{ci} = R_i + a \cdot C_i$$

irrespective of the first, second or third control signal applied to its control signal input 115, and where $L_i$, $R_i$ and $C_i$ are the subband signals in which the signals L, R and C are split up in the splitters SPL2, SPL3 and SPL1 respectively.

Figure 7:
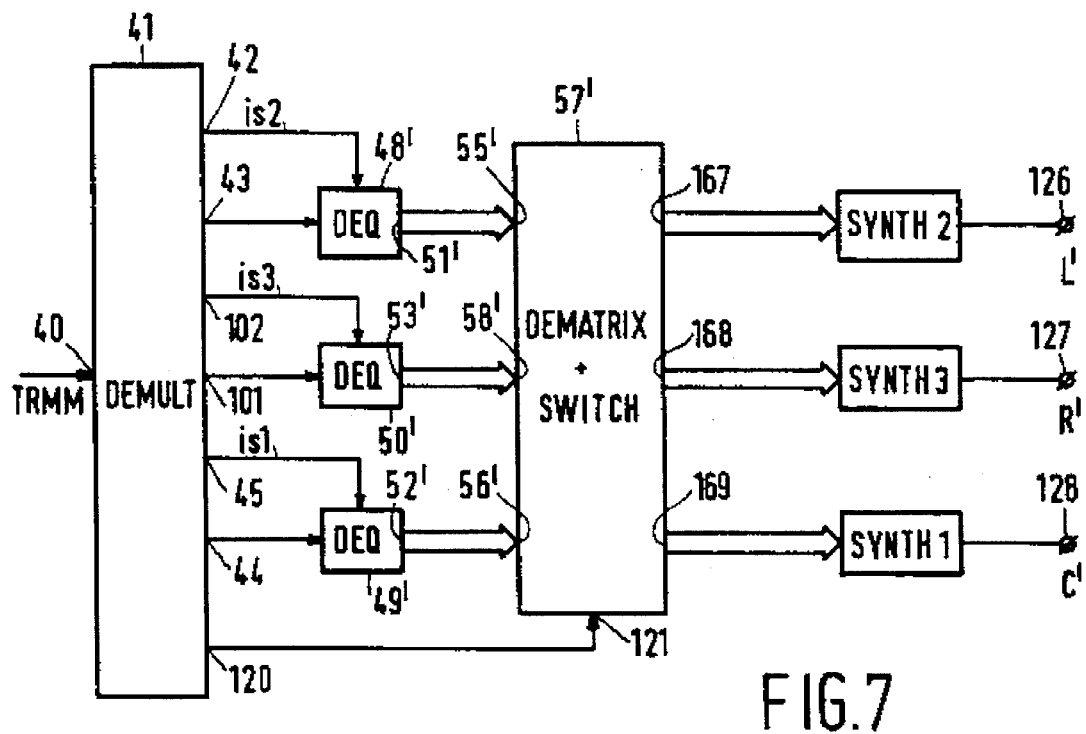
FIG. 7 shows a first embodiment of the receiver.

FIG. 7 shows an embodiment of the receiver for receiving the signal transmitted by the transmitter of FIG. 6. The receiver of FIG. 7 shows much resemblance with the receiver of FIG. 1b. The demultiplexer means 41 is the same as in FIG. 1b. The outputs 43, 101 and 44 of the demultiplexer means 41 are coupled to expansion means 48', 50' and 49' respectively. The expansion means 48', 50' and 49' has the same function as the expansion means 48, 50 and 49 of FIG. 1b, except for the fact that they do not include the subband synthesis filters so as to combine the subband signals into a wideband signal. Outputs 51', 53' and 52' of the expansion means 48', 50' and 49' respectively are coupled to inputs 55', 58' and 56' respectively of dematrixing means 57'. The dematrixing means 57' combine the functions of the matrixing means 57 and the switch means 122 of FIG. 1b, except for the fact that it now dematrixes and switches subband signals instead of wideband signals. The dematrixing means 57' now has the subband signals of the signals L, R and C present at its outputs 167, 168 and 169 respectively. The outputs 160, 161 and 162 are coupled to the output terminals 126, 127 and 128 respectively via synthesis filter means SYNTH2, SYNTH3 and SYNTH1 respectively, which synthesis filter means combine the subband signals so as to obtain replicas L', R' and C' of the original signals L, R and C respectively.

As the system is backwards compatible, the signals at the outputs 51' and 53' can be used in a standard stereo decoder so as to obtain a wide band stereo audio signal.

Figure 8:
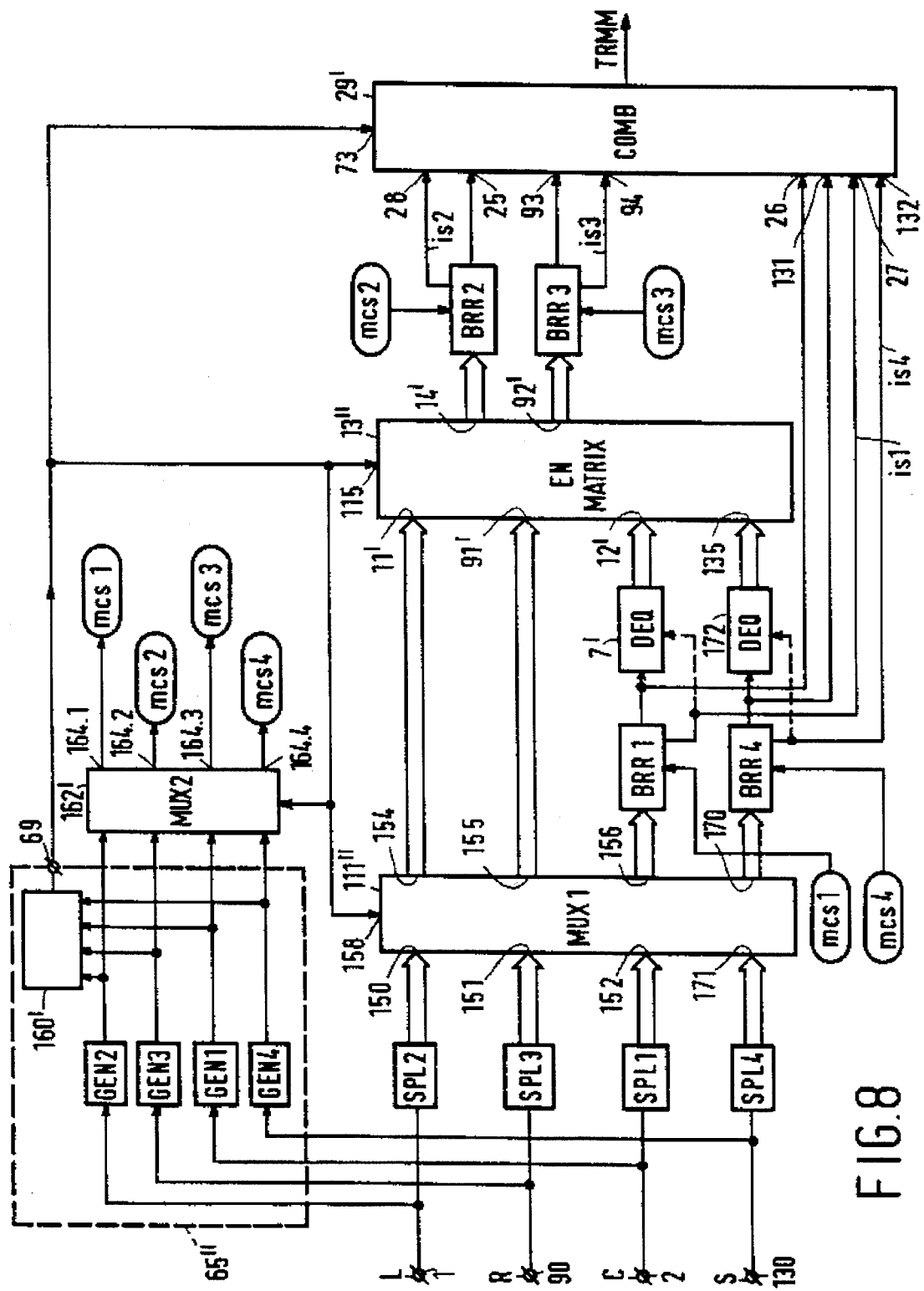
FIG. 8 shows a second embodiment of the transmitter.

FIG. 8 shows an embodiment of a transmitter for transmitting at least four signal components: the already mentioned L-, R- and C-signal component and an additional S-signal component. The transmitter of FIG. 8 shows much resemblance with the transmitter of FIG. 6. The S-signal component can be considered as a surround signal component for two loudspeakers positioned on the left and right hand side behind the listener. The S-signal component can be one single signal, in which case the S-signal is applied to both loudspeakers, or two signals $S_l$ and $S_r$, for the left and right loudspeaker behind the listener respectively. The transmitter of FIG. 8 shows much resemblance with the transmitter of FIG. 6. The transmitter has at least a fourth input terminal 130 for receiving the S-signal component. The input terminal 130 is coupled to a fourth splitter means SPL4, in which the S-signal is split into subband signals. The terminal is also coupled to the calculation means 65", in which there is provided a further generator GEN4 for generating bitallocation information (a masking control signal) from the S-signal. This information is applied to the unit 160' as well as to the second multiplexer 162'.

The output of the splitter SPL4 is coupled to an input 171 of the first multiplexer means 111". A further output 170 of the multiplexer means 111" is present which is coupled to an input of a fourth bitrate reduction means BRR4, which has an output coupled to an input of expansion means 172 as well as to an input 131 of the combination means 29'. An output of the expansion means 172 is coupled to an input 135 of the matrixing means 13".

The first masking control signal mcs1 is applied to BRR1. The first instruction signal is1 is applied to the input 131 of the combination means 29'.

The second masking control signal is applied to BRR2. The second instruction signal is2 applied to the input 28 of the combination means 29'.

The third masking control signal is applied to BRR3. The third instruction signal is3 applied to the input 94 of the combination means 29'.

The fourth masking control signal mcs4 is applied to BRR4. A fourth instruction signal is4 is applied to the input 132 of the combination means 29'.

The cooperation and interconnection between the bitrate reducer BRR4 and the expander 172 is the same as has been described above for the cooperation and the interconnection between the bitrate reducer BRR1 and the expander 7'.

The calculation means 65" are capable of generating a first control signal at the output 69 in the situation when the multiplexer applies the L signal to the output 154, the R-signal to the output 155, the C-signal to the output 156 and the S-signal to the output 170. That means that the first masking control signal mcs1 is obtained by the generator GEN1, that the second masking control signal mcs2 is obtained by the generator GEN2, that the third masking control signal mcs3 is generated by GEN3 and that the fourth masking control signal mcs4 is generated by GEN4.

The calculation means 65" are also capable of generating a second control signal at the output 69 in the situation when the multiplexer applies the L signal to the output 154, the C-signal to the output 155, the R-signal to the output 156 and the S-signal to the output 170. That means that the first masking control signal mcs1 is obtained by the generator GEN3, the second masking control signal mcs2 is obtained by the generator GEN2, the third masking control signal mcs3 is generated by GEN1 and the fourth masking control signal mcs4 is generated by GEN4.

The calculation means 65" are also capable of generating a third control signal at the output 69 in the situation when the multiplexer applies the L signal to the output 156, the C-signal to the output 154, the R-signal to the output 155 and the S-signal to the output 170. That means that the first masking control signal mcs1 is obtained by the generator GEN2, the second masking control signal mcs2 is obtained by the generator GEN1, the third masking control signal mcs3 is generated by GEN3 and the fourth masking control signal mcs4 is generated by GEN4.

The calculation means 65" are further capable of generating a fourth control signal at the output 69 in the situation when the multiplexer applies the L signal to the output 154, the S-signal to the output 155, the C-signal to the output 156 and the R-signal to the output 170. That means that the first masking control signal mcs1 is obtained by the generator GEN1, the second masking control signal mcs2 is obtained by the generator GEN2, the third masking control signal mcs3 is generated by GEN4 and the fourth masking control signal mcs4 is generated by GEN3.

The calculation means 65" are moreover capable of generating a fifth control signal at the output 69 in the situation when the multiplexer applies the L signal to the output 170, the S-signal to the output 154, the C-signal to the output 156 and the R-signal to the output 155. That means that the first masking control signal mcs1 is obtained by the generator GEN1, the second masking control signal mcs2 is obtained by the generator GEN4, the third masking control signal mcs3 is generated by GEN3 and the fourth masking control signal mcs4 is generated by GEN2.

The matrixing means 13" generates first and second output signals $L_{cs}$ and $R_{cs}$, respectively at outputs 14' and 92' respectively, which satisfy the following equations:

$$L_{cs}=L+a\cdot C+b\cdot S$$

$$R_{cs}=R+a\cdot C+b\cdot S$$

irrespective of the first, second, third, fourth or fifth control signal applied to the control signal input 115.

Both signals $L_{cs}$ and $R_{cs}$ are applied to the compression means BRR2 and BRR3 respectively.

The first, second, third, fourth or fifth control signal is generated by the unit 160' in the calculation means 65", dependent of which of the five permutations of the four signals given above realizes the largest compression ratio.

Figure 9:
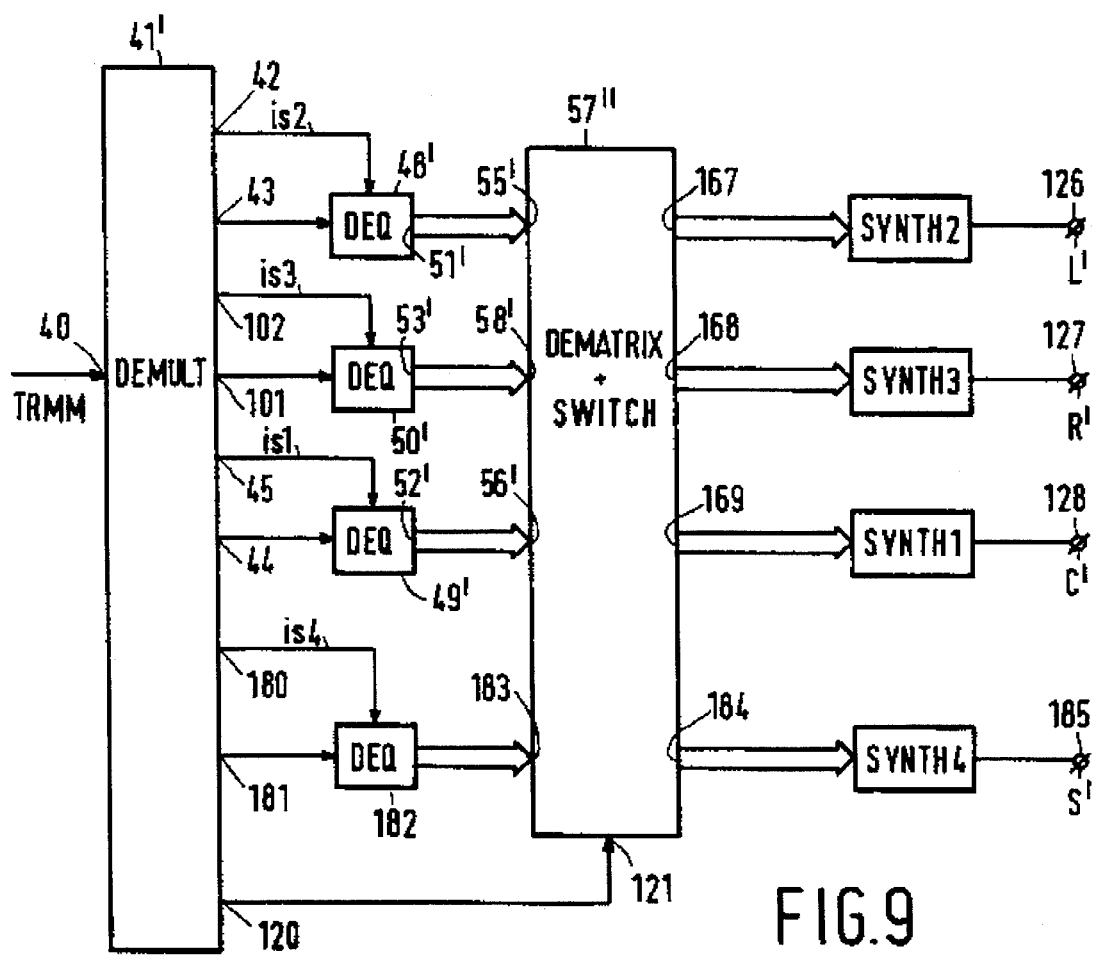
FIG. 9 shows a second embodiment of the receiver.

FIG. 9 shows an embodiment of a receiver for receiving the signals transmitted by the transmitter of FIG. 8. The receiver of FIG. 9 shows much resemblance with the receiver of FIG. 7. The demultiplexing means 41' has further an output 180 for supplying the fourth instruction signal is4, an output 181 for supplying the data reduced information to a further expansion means DEQ 182. An output of the expansion means 182 is coupled to a further input 183 of the dematrixing means 57". The dematrixing means 57" functions in the same way as the dematrixing means 57' in FIG. 7. It dematrixes the signals applied to its inputs and switches the signals obtained in such a way that subband signals corresponding to the L-, the R-, the C- and the S-signal are present at the outputs 167, 168, 169 and 184 respectively. After subband signal combination in the subband synthesis filters SYNTH2, SYNTH3, SYNTH1 and SYNTH4, the replicas L', R', C' and S' of the signals L, R, C and S respectively are present at the output terminals 126, 127, 128 and 185 respectively.

For the situation that five signals are applied to the transmitter, the matrixing means generates first and second output signals $L_{cs}'$ and $R_{cs}'$ which satisfy the following equations:

$$L_{cs}=L+a\cdot C+b\cdot S_l+c\cdot S_r$$

$$R_{cs}=R+a\cdot C+c\cdot S_l+b\cdot S_r$$

From a further description of a transmitter for encoding and transmitting the five signals given above, and from a further description of a receiver for receiving and decoding the five signals given above, is refrained as, with the information given above, such transmitter and receiver is a straightforward further development of the transmitters and receivers discussed earlier. The skilled man will be able to develop an embodiment of such transmitter and receiver, using his skill and without the need of any inventive activity.

It should further be noted that extensions to more than a five signal transmission is possible. In a six-signal transmission, the sixth signal can be an effect signal, which signal is well known in movie reproduction.

Figure 10:
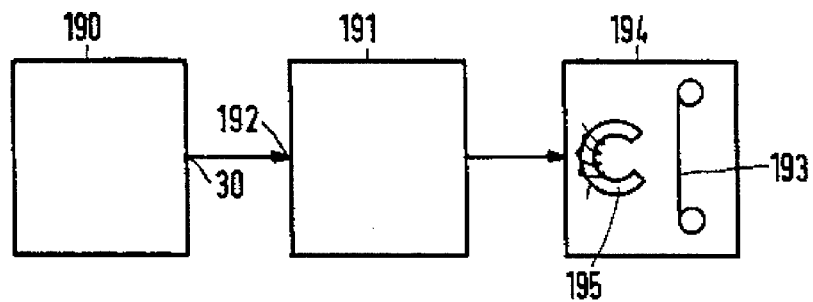
FIG. 10 shows the transmitter in the form of a recording arrangement for recording the signals on a record carrier.

The transmitter can be used in an arrangement for recording the signal supplied by the signal combination means 29 and 29' on a record carrier. FIG. 10 schematically shows such a recording arrangement. The block denoted by 190 is one of the transmitters described previously. The block denoted by 191 is a channel encoder, in which the signal applied to its input 192 is encoded in, as an example a Reed-Solomon encoder, and an interleaver, so as to enable an error correction to be carried out in the receiver. Further, again as an example, an 8-to-10 modulation well known in the art, see document (5) in the list of references, is carried out. The signal thus obtained is recorded in a track on a record carrier 193, such as a magnetic or optical record carrier, by means of writing means 194, such as a magnetic or optical head 195.

The receiver (not shown in the figures) can be used in an arrangement for reproducing the first and second main signal component and the at least one auxiliary signal component from the above record carrier. A signal processing must be carried out on the reproduced information which is inverse to the signal processing during recording. That is: a 10-to-8 reconversion must be carried, followed by an error correction and a de-interleaving. This is followed by a circuit such as the circuit of FIG. 7 or 9.

Figure 11:
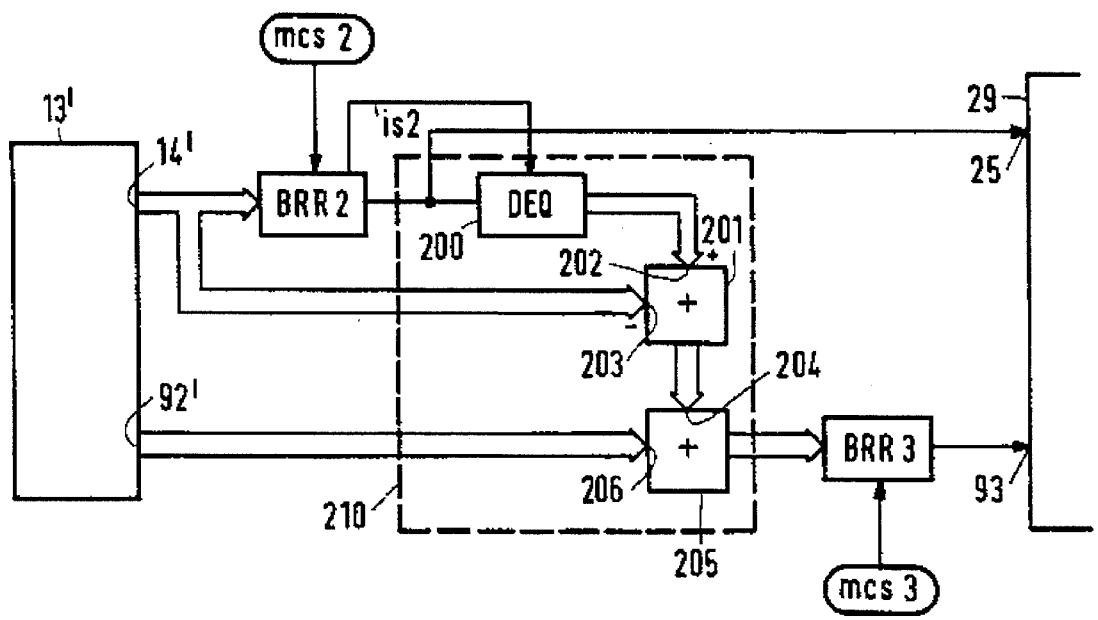
FIG. 11 shows an embodiment of a compensation circuit that can be used in the transmitters described.

FIG. 11 shows a further improvement of the transmitter of FIG. 1, 6 en 8. Suppose that in the transmitter of FIG. 6, the third control signal is supplied by the calculation means 65, and that the constant a equals unity. As a result, the signals $L_c$, $R_c$ and L are transmitted after quantization. That is: the (L+C)-signal, after quantization under the influence of the masking control signal mcs2 derived by GEN1 from C, where L has been quantized, i.e. the quantized replica of the original L-signal is used in creating the (L+C)-signal, the (R+C)-signal after quantization under the influence of the masking control signal mcs3 derived by GEN3 from R, and the L-signal after quantization under the influence of the masking control signal mcs1 derived by GEN2 from L.

At the receiver, the C- and R-signals are to be determined by means of dematrixing of the three transmitted signals. C is obtained from the received (L+C)-signal and the L-signal. Due to the measures taken upon quantizing (L+C), namely prequantization of L and the masking control signal being derived from the C-signal, the quantization distortion in the so-calculated replica of C will remain masked, as has been explained in the documents (1b) and (2).

However, upon calculating the replica of the R-signal, this is not guaranteed. The replica of the R-signal, is calculated from the received (R+C)-signal, using the C-signal obtained in the way as explained above. The (R+C)-signal has been quantized under the influence of the masking control signal derived from the R-signal, but the C-signal pan in the (R+C)-signal has not been prequantized. This could of course have been implemented in a way analogous to the way as explained in the documents (1b) and (2). However, this solution leads to a rather complex structure.

A more simple configuration to implement this is given in FIG. 11.

The compensation circuit 210 of FIG. 11 can be inserted between the outputs 14' and 92' of the matrixing means 13' or 13" and the inputs 25 and 93 of the signal combination means 29 or 29'.

As can be seen in FIG. 11, the compensation circuit 210 includes an expansion means 200, which carries out an expansion on the datareduced signal supplied by the bitrate reducer BRR2, under the influence of the same instruction signal is2. The dequantized subband signals thus obtained in the expansion means 200 are supplied to an input 202 of a subtractor circuit 201. Further, the subband signals supplied by the matrixing means at its output 14' is supplied to a second input 203 of the subtractor circuit 201. In the subtractor circuit 201, each subband signal of the M subband signals supplied by the matrixing means 13' are subtracted from the corresponding subband signal of the M subband signals supplied by the expansion means 200, so as to obtain M compensation signals. Those compensation signals are supplied to an input 204 of an adder circuit 205. The output 92' of the matrixing means 13' is coupled to a second input 206 of the adder circuit 205, an output of which is coupled to the input of the bitrate reducer BRR3. Each of the M compensation signals is added to a corresponding one of the M subband signals applied by the matrixing means 13', and the signals thus obtained are applied to the bitrate reducer BRR3.

The cooperation and the interconnection between the bitrate reducer BRR2 and the expander 200 is the same as has been described above for the cooperation and interconnection between the bitrate reducer BRR1 and the expander 7'.

The signal combination circuits 201 and 205 are in the form of a subtractor and an adder respectively. It should however be noted that, if one of the signals applied to one of the signal combination circuits 201 and 205 have an inverse polarity, the adder turns into a subtractor and vice versa. Further, it will be clear that the two circuits 201 and 205 could have been combined into one signal combination unit, with three inputs 202, 203 and 206, and only one output, namely the output of the circuit 205.

By means of the elements 200 and 201 in the circuit 210, the quantization distortion in the (L+C)-signal, present at the output of the bitrate reducer BRR2 is determined and is added to the (R+C)-signal by means of the element 205. The signal thus obtained is quantized under the influence of the masking control signal (mcs3) derived from the R-signal. Note, that the distortion added to the (R+C)-signal is masked by the C-signal, so that it is also masked by the (R+C)-signal.

At the receiver side, the C-signal is derived in the dematrixing means 57' from the (L+C)-signal and the L-signal. As the L-component in the (L+C)-signal is the same L-signal as that received, the C-signal so derived contains thus exactly the same quantization distortion as the received (L+C)-signal. This distortion is also present in the now received (R+C)-signal and thus will be removed upon deriving the R-signal component by subtracting C from R+C. The only quantization distortion that remains in the now calculated R-signal is that due to the quantization of (R+C). This quantization component was based upon the masking control signal mcs3 derived from R and will thus be masked.

Figure 12:
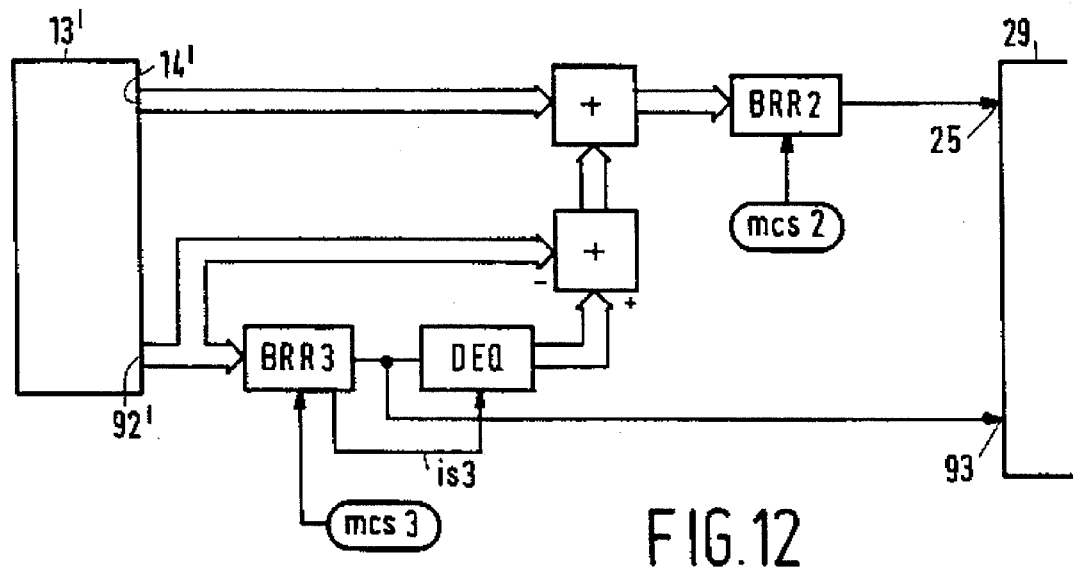
FIG. 12 shows the compensation circuit used in a different way in the transmitter.

It should be noted that, if the R-signal is the third signal transmitted together with the $L_c$ and $R_c$ signal, the 'mirrored' circuit of FIG. 12 should be used instead of the circuit of FIG. 11.

Either circuit needs to be used if a signal which is mixed in both compatible signals $L_c$ and $R_c$ is calculated by the receiver from these compatible signal (like C in the above example). The selection whether the circuit of FIG. 11 or FIG. 12 applies depends on which signal of the compatible pair is quantized under the influence of the masking control signal derived from that common signal. In the above example, this was the (L+C)-signal, and thus FIG. 11 was used.

More specifically, in the embodiment of FIG. 6: if the (L+C)-signal, the (R+C)-signal and the C-signal are transmitted, the compensation circuits of FIG. 11 or 12 are not used. If the (L+C)-signal, the (R+C)-signal and the L-signal are transmitted, the circuit of FIG. 11 is used. If the (L+C)-signal, the (R+C)-signal and the R-signal are transmitted, the circuit of FIG. 12 is used.

For the embodiment of FIG. 8: if the (L+C+S)-signal, the (R+C+S)-signal, the C-signal and the S-signal are transmitted, the compensation circuits of FIGS. 11 or 12 are not used. If the (L+C+S)-signal, the (R+C+S)-signal, the L-signal and the S-signal are transmitted, the circuit of FIG. 11 is used. If the (L+C+S)-signal, the (R+C+S)-signal, the R-signal and the S-signal are transmitted, the circuit of FIG. 12 is used. If the (L+C+S)-signal, the (R+C+S)-signal, the L-signal and the C-signal are transmitted, the circuit of FIG. 11 is used. If the (L+C+S)-signal, the (R+C+S)-signal, the R-signal and the C-signal are transmitted, the circuit of FIG. 12 is used. Therefore, the transmitters can be provided with one such compensation circuit which is switched into the transmitter circuits of FIGS. 6 and 8 in the way shown in FIG. 11 (a mode one) or in the way shown in FIG. 12 (a mode two), dependent of which signals are transmitted. Switching means (not shown), should be available to realize the switching of the compensation circuit into the transmitter circuit (in the modes one and two) or out of the transmitter circuit (in a third mode). The switching means can switch the compensation circuit into the various modes in response to the first, second or third control signal, discussed with reference to the embodiment of FIG. 6, or in response to the first to the fifth control signal, discussed above with reference to the embodiment of FIG. 8.

The compensation circuit described in FIG. 11 and 12 can also be used in the known transmitters described in the U.S. patent application Ser. No. 32,915 mentioned previously or in the transmitter of FIG. 1.

Figure 13:
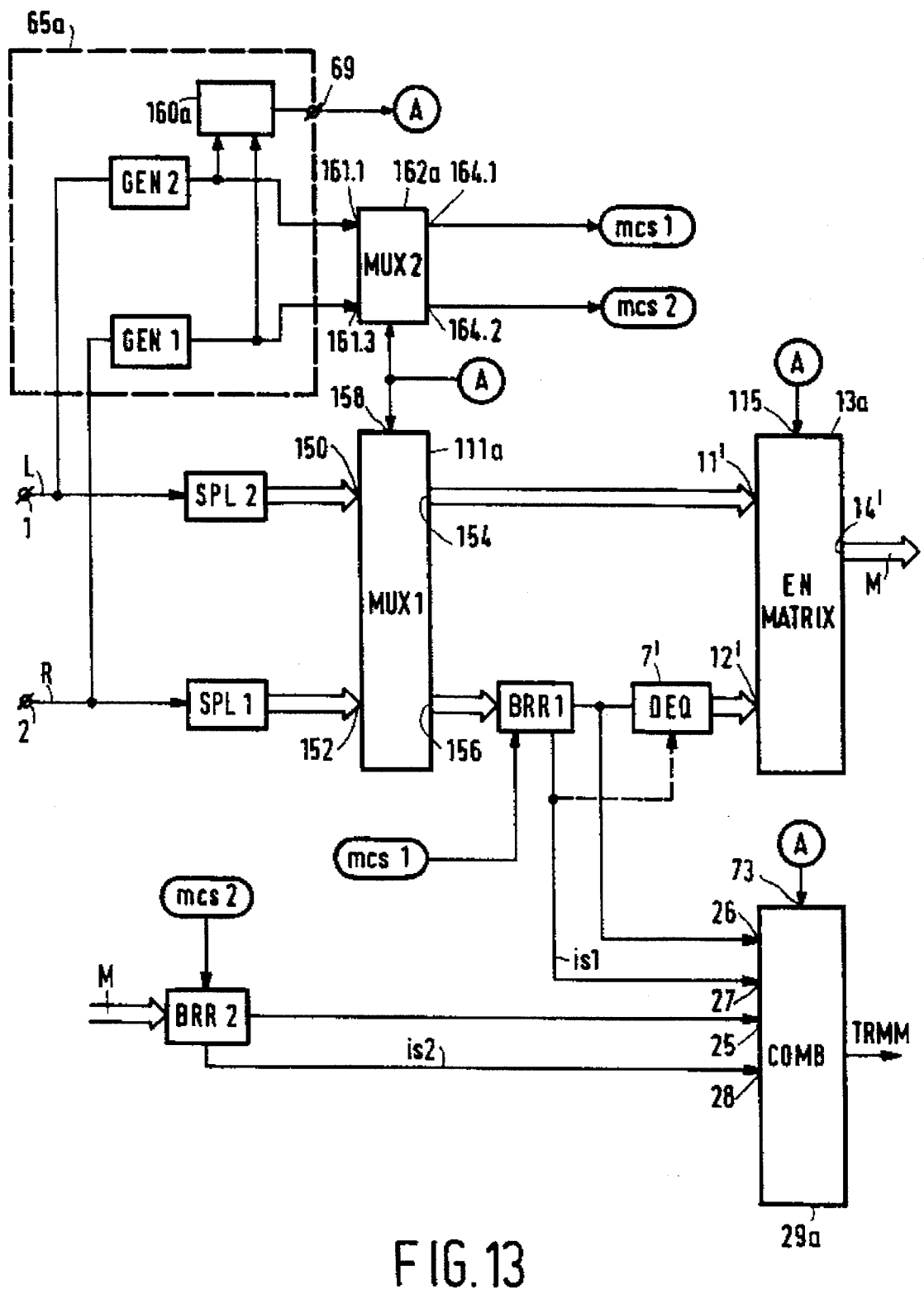
FIG. 13 shows an embodiment of the transmitter for transmitting a first and second main signal component.

A further embodiment of the transmitter apparatus is shown in FIG. 13.

The transmitter of FIG. 13 has input terminals 1 and 2, to which the signals L, R respectively are supplied. Those input terminals are coupled to subband splitters SPL2 and SPL1 respectively. The subband signals obtained are supplied to inputs 150 and 152 respectively of multiplexer 111a. The multiplexer 111a has the same function as the switching means 111' of FIG. 6, except for the fact that it now multiplexes only two signal components. The output 154 of the multiplexer 111a is coupled to input 11' of matrixing means 13a. The output 156 of the multiplexer 111a is coupled to an input of the bitrate reducing means BRR1. The output of the bitrate reducing means BRR1 is coupled to the input of expansion means (DEQ) 7', as well as to the input 26 of the signal combination means 29a. An output of the expansion means 7' is coupled to the input 12' of the matrixing means 13a.

What has been said above in relation to the cooperation and interconnection between the bitrate reducer BRR1 and the expander 7 in FIG. 1, is equally valid for the bitrate reducer BRR1 and expander 7' in FIG. 13.

The matrixing means 13a functions so as to obtain an output signal M at an output 14' which is proportional to the sum of the signals applied to the inputs 11' and 12'. The output 14' of the matrixing means 13a is coupled via bitrate reducing means BRR2, to the input 25 of the combining means 29a.

Calculation means 65a are present. The calculation means 65a function in an equivalent way to the calculation means 65' in FIG. 6, in that it now generates a first and second control signal only at its output 69. This control signal is applied a control signal input 158 of the multiplexer 111a, to the control signal input of the multiplexer 162a, to the control signal input 115 of the matrixing means 13a and to the input 73 of the combining means 29a. The calculation means 65a comprise the generators GEN1 and GEN2. The masking control signals generated by the generators GEN1 and GEN2 are supplied to inputs 161.3 and 161.1 respectively of a second multiplexer 162a. At outputs 164.1 and 164.2 are masking control signals mcs1 and mcs2 respectively available.

The masking control signal mcs1 is applied to the bitrate reducing means BRR1. The masking control signal mcs2 is applied to the bitrate reducing means BRR2.

In response to the first control signal applied to the input 158, the multiplexer 111a is switched in such a position that the subband signals of the L- and R-signals are applied to the inputs 11' and 12' respectively of the matrixing means 13a. Further, the multiplexer 162a is switched in a such a position that the masking control signal generated by the generator GEN1 is the first masking control signal mcs1 and the masking control signal generated by the generator GEN2 is the second masking control signal mcs2.

In response to the second control signal, the multiplexer 111a is switched in such a position that the subband signals of the L- and R-signals are applied to the inputs 12' and 11' respectively of the matrixing means 13a. Further, the multiplexer 162a is switched in such a position that the masking control signal generated by the generator GEN2 is the first masking control signal mcs1 and the masking control signal generated by the generator GEN1 is the second masking control signal mcs2.

As already explained, the matrixing means 13a generates in response to the control signal applied to its control signal input 115, at its output 14' subband signals $M_i$ which satisfy the following equation:

$$M_i = a.L_i + b.R_i.$$

If the constants a and b are equal to each other, the control signal A applied to the control signal input 115, and thus the control signal input 115 itself, may be dispensed with.

Figure 14:
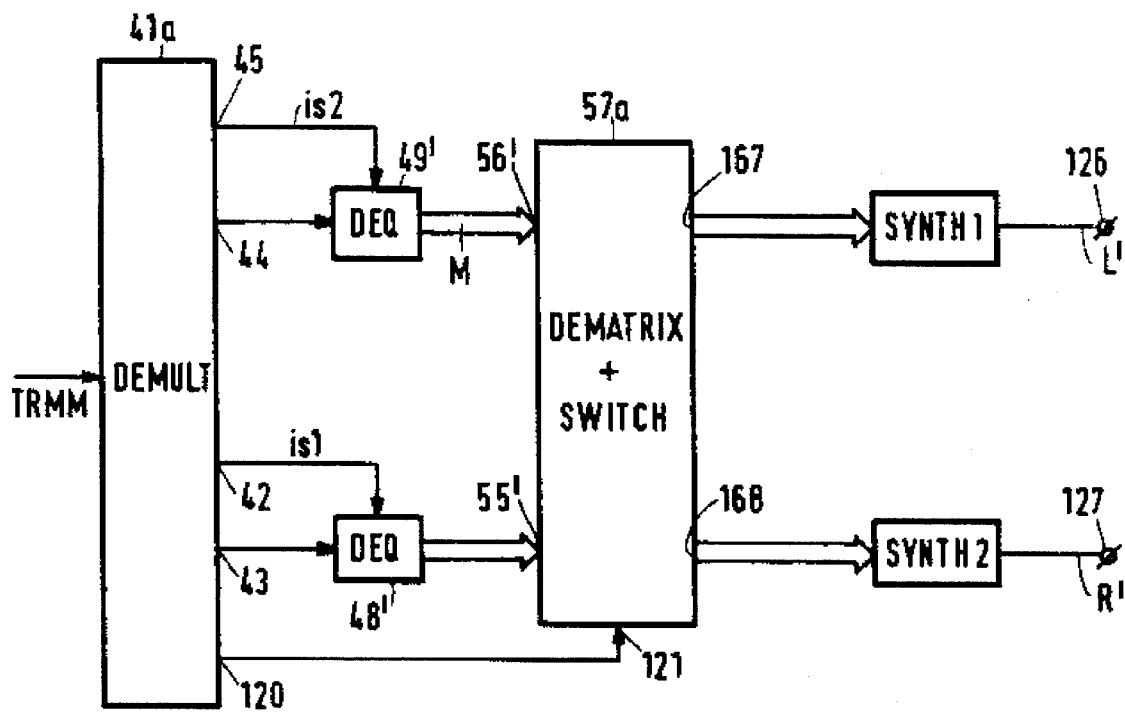
FIG. 14 shows an embodiment of the receiver for receiving the first and second main signal component transmitted by the transmitter of FIG. 13.

FIG. 14 shows an embodiment of the receiver for receiving the signal transmitted by the transmitter of FIG. 13. The outputs 43 and 44 of the demultiplexer means 41a are coupled to expansion means 48' and 49' respectively. Outputs of the expansion means 48' and 49' are coupled to inputs 55' and 56' respectively of dematrixing and switching means 57a. The dematrixing and switching means 57a now has the subband signals of the signals L and R present at its outputs 167 and 168 respectively. The outputs 167 and 168 are coupled to the output terminals 126 and 127 respectively via synthesis filter means SYNTH1 and SYNTH2 respectively, which synthesis filter means combine the subband signals so as to obtain replicas L' and R' of the original signals L and R respectively.

Figure 14A:
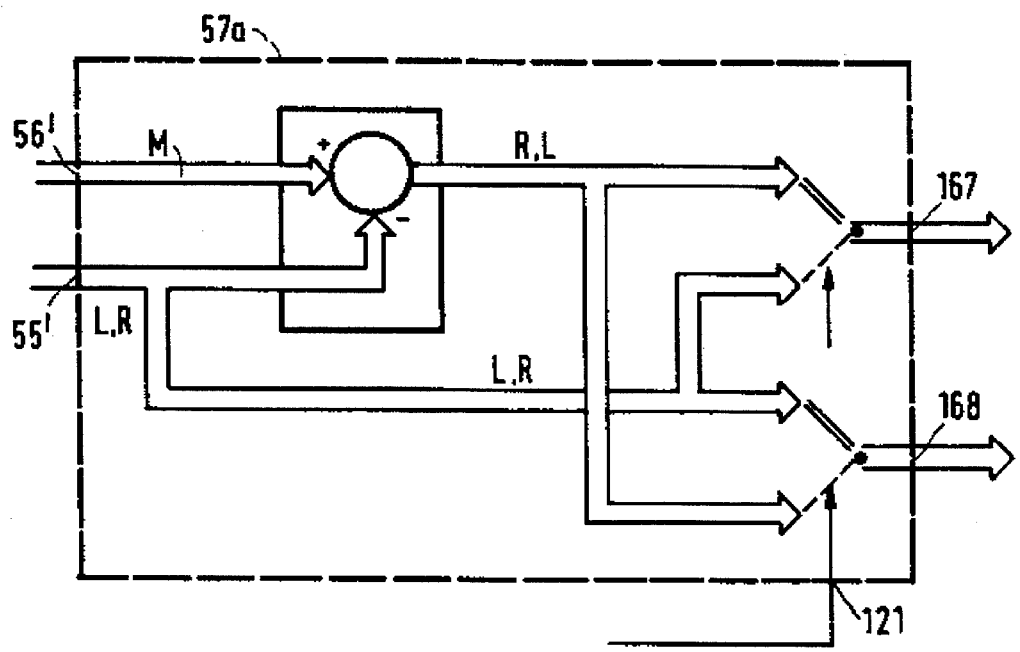
FIG. 14a shows a detailed embodiment of the dematrixing and switching means of FIG. 14, FIG. 15 an explanation of multiplexing on subsignal level for a 2-channel version, and FIG. 16 an explanation of multiplexing on subsignal level for a 3-channel version.

FIG. 14a shows a more detailed diagram of the dematrixing and switching means 57a of FIG. 14. It is assumed here that the constants a and b of the formula given above both equal unity. The means 57a include a dematrixing unit which combines the signals applied to the inputs 55' and 56' and generates either the L or the R signal component, dependent of which of the two signal components is applied to the input 55'. Further, controllable switches are present to couple, in response to the control signal applied to the control signal input 121 of the means 57a, the outputs 167 and 168 to either the output of the dematrixing unit and the input 55' or the other way around, again dependent of which of the R and L signal components is applied to the input 55'.

It has been explained above that the blocks denoted by GEN generate the bit allocation information which enables a data compression means to carry out data compression on the signal that should be compressed. Those generator blocks GEN generally comprise a power determining means for determining the signal power in the subbands or for determining the signal power as a function of frequency. Further, a masking value determining means is present for determining a masking power value in each of the subbands or for determining the masking power as a function of frequency, using the power information obtained by the power determining means. Further, bit allocation determining means are present for determining the bit allocation information (the number of bits per sample for samples in time equivalent signal blocks, one signal block in each of the subbands).

If the switching in the multiplexer 111' takes place on the boundaries of those signal blocks, it may be possible to move the bitallocation means of the three generators, such as in FIG. 6, to a position after the multiplexer 162. This for the reason that the power information may be sufficient for the block 160 to derive the control signal therefrom.

In another embodiment, the terminals 1, 90 and 2 could have been coupled to the inputs 161.1, 161.2 and 161.3 of the multiplexer 162 directly. The control signal can be obtained by the block 160 by coupling the inputs of that block to the input terminals via power determining means defined above, and generators GEN1, GEN2 and GEN3 could have been inserted directly after the multiplexer 162 so as to obtain the masking control signals mcs1, mcs2 and mcs3.

In the foregoing, it has been explained how complete signal components are multiplexed, such as by multiplexer 111' in FIG. 6. This means that all M subsignals of a signal component are multiplexed to the same output 154, 155 or 156. In a further embodiment however, it may be possible to multiplex corresponding subsignals or corresponding subsignal groups to different outputs. This means that the control signal A, generated by the units 160, 160' and 160a in the FIGS. 6, 8 and 13 respectively is now a multi component control signal, one for each of the subsignal groups to be multiplexed. The functioning of such embodiment for transmitting a two channel signal L and R, will be further explained with reference to FIG. 15, where further use will be made of the embodiment of FIG. 13.

In (a) of FIG. 15, it is assumed that the frequency range of the left hand signal component L is divided into four subsignal frequency bands so as to obtain 4 subsignals. Or M equals 4. For multiplexing in the multiplexer 111a in FIG. 13, the two highest frequency bands are grouped together. As a result, three groups of frequency bands $G_1$, $G_2$ and $G_3$ are present. The numbers 3, 4, 6 and 4 indicate the numbers of bits per sample required to data compress the four subsignals in the left hand signal component. In the same way, (b) in FIG. 15 indicate by the numbers 2, 5, 8 and 1 the numbers of bits per sample required to data compress the four subsignals in the right hand signal component R. Those numbers have been obtained in a well known way.

Upon comparing the numbers of bits per sample for the various subsignals of the left and right hand signal components, it can be decided which group of subsignals is supplied to which output of the multiplexer 111a. Those group of subsignals having the highest number of bits per sample will be applied to the output 154 of the multiplexer 111a. As a result, shown in (c) of FIG. 15, the subsignal groups $G_1$ and $G_3$ of the L signal component and the subsignal group $G_2$ of the R signal component is supplied to the output 154. The decision for the subsignal group $G_3$ is based on adding the numbers of bits per sample for the two subsignals of the L signal and of the R signal in said group and on deciding which sum is higher. As a result, at the output 156 of the multiplexer appear the complementary subsignals, see (d) of FIG. 15. This all happens in response to a three component control signal A, applied to the control input 158.

It should be noted that the decision rule presented above does not yield the optimal switching settings. Better settings are obtained if the switching is based on the power in each subsignal group. The decision rule presented above has been used for clarity of explanation.

At the output 14' of the matrixing means 13a, the sum of the subsignals in each group is available, as shown in (e) of FIG. 15. The numbers of bits per sample needed for the bitrate reduction in BRR1, is given in (f) of FIG. 15, and follows straightforward from the fact that in the subsignal groups $G_1$ and $G_3$ of the R signal component and the subsignal group $G_2$ of the L signal component are supplied to the bitrate reduction unit BRR1.

The numbers of bits per sample for the bitrate reducer BRR2 are obtained in the following way. The signal power $P_i$ in each of the four frequency bands for the sum signal L+R is derived in a well known way. Further, the masking threshold $MT_i$ in each of the four frequency bands is derived in the following way. $MT_1$ is the masking threshold of the L signal component in the first frequency band, $MT_2$ is the masking threshold of the R signal component in the second frequency band, and $MT_3$ and $MT_4$ are the masking thresholds of the L signal component in the two highest frequency bands, see also (c) of FIG. 15. Next, the bitneed in each subsignal frequency band can be derived from $P_i-M_i$, as the bitneeds are proportional to $P_i-M_i$. Using these four values for the bitneeds, the bit allocation information (the four numbers of bits per sample, one for each of the four frequency bands, and thus the $mcs_2$ information) can be obtained in a well known way.

It will be clear that the modified version of the control signal A is needed in the receiver in order to combine the correct subsignals in the dematrixing and switching unit 57a so as to obtain the replica of the L and R signal component.

Next, the three-channel version will be explained with reference to FIG. 16, in combination with FIG. 6.

In (a) of FIG. 16, the frequency range of the left hand signal component L is shown, divided into four frequency bands. Again, four subsignals are assumed to cover the complete frequency spectrum. For multiplexing in the multiplexer 111' in FIG. 6, the two highest frequency bands are grouped together. As a result, three groups of frequency bands $G_1$, $G_2$ and $G_3$ are present. The numbers 2, 5, 7 and 3 indicate the numbers of bits per sample required to data compress the four subsignals in the left hand signal component. In the same way, (b) in FIG. 16 indicates by the numbers 3, 4, 1 and 2 the numbers of bits per sample required to data compress the four subsignals in the right hand signal component R. (c) in FIG. 16 indicates by the numbers 5, 3, 8 and 1 the numbers of bits per sample required to data compress the C signal component. Those numbers have been obtained in a well known way.

Upon comparing the numbers of bits per sample for the various subsignals of the L, R and C signal components, it can be decided which group of subsignals is supplied to which output of the multiplexer 111'. Again, for ease of explanation, the decision rule is used that those group of subsignals having the lowest number of bits per sample will be applied to the output 156 of the multiplexer 111'. As a result, shown in (f) of FIG. 16, the subsignal groups $G_1$ of the L signal, $G_2$ of the $C_3$ signal and $G_3$ of the R signal component is supplied to the output 156. (d) of FIG. 16 indicates which subsignal components are applied to the output 154 and (e) of FIG. 16 indicates which subsignal components are supplied to the output 155 of the multiplexer 111'. This all happens in response to a three component control signal A, applied to the control input 158.

At the output 14' of the matrixing means 13', the sum of the subsignals L+C in each group is available, as shown in (h) of FIG. 16. At the output 92' of the matrixing means 13', the sum of the subsignals R+C in each group is available, as shown in (i) in FIG. 16. The numbers of bits per sample needed for the bitrate reduction in BRR1, is given in (g) of FIG. 16, and follows straightforward from the fact that the subsignals in group $G_1$ of the L signal component, in group $G_2$ of the C signal component and in group $G_3$ of the R signal component are supplied to the bitrate reduction unit BRR1.

The numbers of bits per sample for the bitrate reducer BRR2 are obtained in the following way. The signal power $P_i$ in each of the four frequency bands for the sum signal L+C is derived in a well known way. Further, the masking threshold $MT_i$ in each of the four frequency bands is derived in the following way. $MT_1$ is the masking threshold of the C signal component in the first frequency band and $MT_2$, $MT_3$ and $MT_4$ are the masking thresholds of the L signal component in the second, third and fourth frequency band, see also (d) of FIG. 16. Next, the bitneeds are again derived from $P_i-M_i$. Using these four values for the bitneeds, the bit allocation information (the four numbers of bits per sample, one for each of the four frequency bands, and thus the $mcs_2$ information) can be obtained in a well known way.

The numbers of bits per sample for the bitrate reducer BRR3 are obtained in the following way. The signal power $P_i$ in each of the four frequency bands for the sum signal R+C is derived in a well known way. Further, the masking threshold $MT_i$ in each of the four frequency bands is derived in the following way. $MT_1$ and $MT_2$ are the masking thresholds of the R signal component in the first and second frequency bands and $MT_3$ and $MT_4$ are the masking thresholds of the C signal component in the third and fourth frequency band, see also (e) of FIG. 16. Next, again the bitneeds are derived from $P_i-M_i$. Using these four values for the bitneeds, the bit allocation information (the four numbers of bits per sample, one for each of the four frequency bands, and thus the $mcs_3$ information) can be obtained in a well known way.

It will be clear that the modified version of the control signal A is needed in the receiver in order to combine the correct subsignals in the dematrixing and switching unit 57' so as to obtain the replicas of the L, R and C signal component. It will further be clear that the switching means, such as the switching means in FIG. 14a and such as included in the dematrixing and switching means in the FIGS. 7 and 9 must be capable of switching the various (groups of) subsignals to the correct outputs.

REFERENCES

List of related documents, to be printed oil the front page of the patent document.

(1a) J.A.E.S., Vol. 40, No. 5, May 1992, pp. 376–382, (1b) 'Matrixing of bitrate reduced audio signals' by W. R. Th. the Kate et al, in Proc. of the ICASSP, 1992, March 23–26, San Francisco, Vol. 2, pp. II-205 to II-208.

(2) U.S. patent application Ser. No. 32,915 (PHQ 93-002)

(3) European Patent Application no. 402,973 (PHN 13.241).

(4) European patent application no. 497,413A1 (PHN 13.581)

(5) U.S. Pat. No. 4,620,311 (PHN 11.117).

(6) European Patent Application no. 400.755 (PHQ 89.018A).

(7a) European Patent Application no. 457,390 (PHN 13.328).

(7b) European Patent Application no. 457,391 (PHN 13.329).

I claim:

1. A transmitter for transmitting at least a first and a second main signal component via a transmission medium, the transmitter comprising at least a first and a second input terminal for receiving the first and second main signal component, at least a first and a second signal conversion means, each having an input coupled to a corresponding one of the input terminals and an output, the conversion means being adapted to convert an input signal applied to its input into M subsignals and to apply the M subsignals to its output, multiplexer means having at least a first and a second input coupled to the outputs of the at least two signal conversion means, at least a first and a second output and a control signal input, first compression means having an input coupled to the at least second output of the multiplexer means, the first compression means being adapted to carry out a data reduction step on the signal applied to its input in response to a first masking control signal and to supply a data compressed signal to an output, masking control signal generator means for generating the first masking control signal for the first compression means, the first masking control signal having a relationship with a masking threshold of the signal applied to the input of the first compression means, first expansion means is having an input and an output, the input being coupled to the first compression means, the expansion means being adapted to carry out a data expansion on the signal applied to its input so as to obtain a replica of the signal applied to the input of the first compression means and to supply the replica to its output, matrixing means having at least a first and a second input, the first input being coupled to the first output of the multiplexer means and the second input being coupled to the output of the first expansion means, the matrixing means further having an output for supplying an output signal, the matrixing means being adapted to combine the signal applied to its first input and at least the signal applied to its second input so as to obtain the output signal, second compression means having an input coupled to the output of the matrixing means and an output, the second compression means being adapted to carry out a data reduction step on the signal applied to its input in response to a second masking control signal and to supply a data reduced output signal to its output, the masking control signal generator means being adapted to generate the second masking control signal for the second compression means, the second masking control signal having a relationship with a masking threshold of the signal applied to the first input of the matrixing means, instruction signal generator means for generating at least first and second instruction signals, the first instruction signal being generated for enabling an expansion in a receiver on the data reduced output signal of the first compression means so as to obtain a replica of the signal applied to the input of the first compression means, the second instruction signal being generated for enabling an expansion in the receiver on the data reduced output signal of the second compression means so as to obtain a replica of the output signal of the matrixing means, control signal generator means for generating the control signal for the multiplexer means, signal combination means for combining the output signals of the at least first and the second compression means as well as the first and second instruction signal and the control signal so as to enable the transmission of those output signals.

2. A transmitter for transmitting a first and a second main signal component and at least one auxiliary signal component via a transmission medium, characterized in that the transmitter comprises at least three input terminals for receiving the at least three signal components, at least three signal conversion means, each having an input coupled to a corresponding one of the input terminals and an output, the conversion means being adapted to convert an input signal applied to its input into M subsignals and to apply the M subsignals to its output, multiplexer means having at least a first, a second and a third input coupled to the outputs of the at least three signal conversion means, at least a first, a second and a third output and a control signal input, first compression means having an input coupled to the at least third output of the multiplexer means, the first compression means being adapted to carry out a data reduction step on the signal applied to its input in response to a first masking control signal and to supply a first data compressed signal to an output, masking control signal generator means for generating the first masking control signal for the first compression means, the first masking control signal having a relationship with a masking threshold of the signal that is applied to the input of the first compression means, first expansion means having an input and an output, the input being coupled to the first compression means, the expansion means being adapted to carry out an expansion on the signal applied to its input so as to obtain a replica of the signal applied to the input of the first compression means and to supply the replica to its output, matrixing means having at least a first, a second and a third input, the first and second input being coupled to the first and second output respectively of the multiplexer means, and the third input being coupled to the output of the expansion means, the matrixing means having a first and a second output for supplying a first and a second output signal, the matrixing means being adapted to combine the signals applied to its inputs so as to obtain the first output signal which has a relationship with a combination of the first main signal component and the at least one auxiliary signal component, and the second output signal which has a relationship with a combination of the second main signal component and the at least one auxiliary signal component, second and third compression means, each having an input coupled to the first and second output respectively of the matrixing means, and an output, the compression means being adapted to carry out a data reduction step on the signals applied to its inputs in response to second and third masking control signals and to supply data compressed first and second output signals to their outputs, the masking control signal generator means being adapted to generate the second masking control signal for the second compression means, and being adapted to generate the third masking control signal for the third compression means, the second masking control signal having a relationship with a masking threshold of the signal that is applied to first input of the matrixing means, the third masking control signal having a relationship with a masking threshold of the signal applied to the second input of the matrixing means, instruction signal generator means for generating at least first, second and third instruction signals, the first instruction signal being generated for enabling an expansion in a receiver on the data reduced output signal of the first compression means so as to obtain a replica of the signal applied to the input of the first compression means, the second instruction signal being generated for enabling an expansion in the receiver on the data reduced output signal of the second compression means so as to obtain a replica of the first output signal of the matrixing means, the third instruction signal being generated for enabling an expansion in the receiver on the data reduced output signal of the third compression means so as to obtain a replica of the second output signal of the matrixing means, control signal generator means for generating the control signal for the multiplexer means, signal combination means for combining the output signals of the first, second and third compression means as well as the first, second and third instruction signals and the control signal so as to enable the transmission of those output signals.

3. A transmitter as claimed in claim 2, characterized in that the control signal generator comprises calculation means for calculating at least three data reduction ratios, a first data reduction ratio relating to the amount of data reduction realized by the first, second and third compression means together, in the case that the first main signal component would have been applied to the first input of the matrixing means, the second main signal component would have been applied to the second input of the matrixing means, and the at least one auxiliary signal component would have been applied to the input of the first compression means, a second data reduction ratio relating to the amount of data reduction realized by the first, second and third compression means together, for the case that the first main signal component would have been applied to the first input of the matrixing means, the at least one auxiliary signal component would have been applied to the second input of the matrixing means, and the second main signal component would have been applied to the input of the first compression means, a third data reduction ratio relating to the amount of data reduction realized by the first, second and third compression means together, for the case that the at least one auxiliary signal component would have been applied to the first input of the matrixing means, and the second main signal component would have been applied to the second input of the matrixing means and the first main signal component would have been applied to the input of the first compression means, the multiplexing means being adapted to interconnect its inputs with its outputs in such a way that, if the first data reduction ratio is larger than the other data reduction ratios, its first input is connected to its first output, its second input is connected to its second output and its third input is connected to its third output, and if the second data reduction ratio is larger than the other data reduction ratios, its first input is connected to its first output, its second input is connected to its third output and its third input is connected to its second output, and if the third data reduction ratio is larger than the other data reduction ratios, its third input is connected to its first output, it second input is connected to its second output, and its first input is connected to its third output, the control signal generator means being adapted to generate a first control signal in response to the first data reduction ratio being larger than the other data reduction ratios, a second control signal in response to the second data reduction ratio being larger than the other data reduction ratios, and a third control signal in response to the third data reduction ratio being larger than the other data reduction ratios, the signal combination means also being adapted to receive the at least three control signals so as to enable the transmission of those control signals.

4. A transmitter as claimed in claim 3, characterized in that the matrixing means comprise a control signal input for receiving the at least first, second and third control signal.

5. A transmitter as claimed in claim 2, characterized in that, that masking control signal generator means comprise at least a first masking control signal generator for generating the first masking control signal, a second masking control signal generator for generating the second masking control signal and a third masking control signal generator for generating the third masking control signal, each having outputs coupled to inputs of a second multiplexer means, at least three outputs of the second multiplexer means forming the outputs of the masking control signal generator means, the second multiplexer means having a control signal input for receiving the control signal from the control signal generator means.

6. A transmitter as claimed in claim 2, for transmitting a first and a second main signal component and at least a first and a second auxiliary signal component via the transmission medium, characterized in that the transmitter further comprises a fourth input terminal for receiving the at least second auxiliary signal component, a fourth signal conversion means, having an input coupled to the fourth input terminal and an output, the fourth conversion means being adapted to convert the second auxiliary signal component applied to its input into M subsignals and to apply the M subsignals to its output, the multiplexer means having a fourth input coupled to the output of the fourth signal conversion means, and a fourth output, fourth compression means having an input coupled to the fourth output of the multiplexer means, the fourth compression means being adapted to carry out a data reduction step on the signal applied to its input in response to a fourth masking control signal and to supply a fourth data compressed signal to an output, the masking control signal generator means being further adapted to generate the fourth masking control signal for the fourth compression means, the fourth masking control signal having a relationship with a masking threshold of the signal applied to the input of the fourth compression means, second expansion means having an input and an output, the input being coupled to the fourth compression means, the expansion means being adapted to carry out a expansion on the signal applied to its input so as to obtain a replica of the signal applied to the input of the fourth compression means and to supply the replica to its output, the matrixing means having a fourth input being coupled to the output of the second expansion means, the matrixing means being adapted to combine the signals applied to its inputs so as to obtain the first output signal which has a relationship with a combination of the first main signal component and the at least first and second auxiliary signal component, and the second output signal which has a relationship with a combination of the second main signal component and the at least first and second auxiliary signal component, the instruction signal generator means being further adapted to generate a fourth instruction signal for enabling an expansion in the receiver on the data reduced output signal of the fourth compression means so as to obtain a replica of the signal applied to the input of the fourth compression means, the signal combination means being further adapted to combine the output signal of the fourth compression means as well as the fourth instruction signal so as to enable the transmission of those signals.

7. A transmitter as claimed in claim 6, characterized in that, the control signal generator comprises calculation means for calculating at least five data reduction ratios, a first data reduction ratio relating to the amount of data reduction realized by the first, second, third and fourth compression means together, in the case that the first main signal component would have been applied to the first input of the matrixing means, the second main signal component would have been applied to the second input of the matrixing means, the first auxiliary signal component would have been applied to the third input of the matrixing means and the second auxiliary signal component would have been applied to the fourth input of the matrixing means, a second data reduction ratio relating to the amount of data reduction realized by the first, second, third and fourth compression means together, for the case that the first main signal component would have been applied to the first input of the matrixing means, the first auxiliary signal component would have been applied to the second input of the matrixing means, the second main signal component would have been applied to the third input of the matrixing means, and the second auxiliary signal component would have been applied to the fourth input of the matrixing means, a third data reduction ratio relating to the amount of data reduction realized by the first, second, third and fourth compression means together, for the case that the first auxiliary signal component would have been applied to the first input of the matrixing means, and the second main signal component would have been applied to the second input of the matrixing means, the first signal signal component would have been applied to the third input of the matrixing means, and the second auxiliary signal component would have been applied to the fourth input of the matrixing means, a fourth data reduction ratio relating to the amount of data reduction realized by the first, second, third and fourth compression means together, for the case that the first main signal component would have been applied to the first input of the matrixing means, the second auxiliary signal component would have been applied to the second input of the matrixing means, the first auxiliary signal signal component would have been applied to the third input of the matrixing means, and the second main signal component would have been applied to the fourth input of the matrixing means, a fifth data reduction ratio relating to the amount of data reduction realized by the first, second, third and fourth compression means together, for the case that the second auxiliary signal component would have been applied to the first input of the matrixing means, the second main signal component would have been applied to the second input of the matrixing means, the first auxiliary signal signal component would have been applied to the third input of the matrixing means, and the first main signal component would have been applied to the fourth input of the matrixing means, the control signal generator means being adapted to generate a first control signal in response to the first data reduction ratio being larger than the other data reduction ratios, a second control signal in response to the second data reduction ratio being larger than the other data reduction ratios, a third control signal in response to the third data reduction ratio being larger than the other data reduction ratios, a fourth control signal in response to the fourth data reduction ratio being larger than the other data reduction ratios, and a fifth control signal in response to the fifth data reduction ratio being larger than the other data reduction ratios, the multiplexing means being adapted to interconnect its inputs with its outputs in such a way that, in response to the first control signal, its first input is connected to its first output, its second input is connected to its second output, its third input is connected to its third output, and its fourth input is connected to its fourth output, and in response to the second control signal, its first input is connected to its first output, its second input is connected to its third output, its third input is connected to its second output, and its fourth input is connected to its fourth output, and in response to the third control signal, its third input is connected to its first output, it second input is connected to its second output, and its first input is connected to its third output and its fourth input is connected to its fourth output, and in response to the fourth control signal, its first input is connected to its first output, its fourth input is connected to its second output, its third input is connected to its third output, and its second input is connected to its fourth output, and in response to the fifth control signal, its fourth input is connected to its first output, its second input is connected to its second output, its third input is connected to its third output, and its first input is connected to its fourth output, and the signal combination means also being adapted to receive the at least five control signals so as to enable the transmission of those control signals.

8. A transmitter as claimed in claim 7, characterized in that the matrixing means comprise a control signal input for receiving the at least first, second, third, fourth and fifth control signal.

9. A transmitter as claimed in claim 6, characterized in that, the masking control signal generator means further comprise at least a fourth masking control signal generator for generating the fourth masking control signal, the fourth masking control signal generator having an output coupled to a fourth input of the second multiplexer means, at least four outputs of the second multiplexer means forming the outputs of the masking control signal generator means, the second multiplexer means having a control signal input for receiving the control signal from the control signal generator means.

10. A transmitter as claimed in claim 2, characterized in that the transmitter further comprises compensation means having a first, a second and a third input terminal and an output terminal, third expansion means with an input coupled to the first input terminal for receiving an input signal and with an output for supplying an expanded output signal, second signal combination means having a first input coupled to the output of the third expansion means, a second input coupled to the second input terminal of the compensation means, a third input coupled to the third input terminal of the compensation means, and an output, the said output being coupled to the output terminal of the compensation means.

11. A transmitter as claimed in claim 10, characterized in that, the second signal combination means is adapted to add the signal applied to its second input to the signal applied to the first input in a subtractive way, and to add the signal applied to its third input in an additive way.

12. A transmitter as claimed in claim 10, characterized in that, the transmitter comprises switching means for coupling, in a first mode, the first input terminal of the compensation means to the second compression means, the second input terminal of the compensation means to the first output of the matrixing means, the third input terminal of the compensation means to the second output of the matrixing means, and the output terminal of the compensation means to the input of the third compression means, for coupling, in a second mode, the first input terminal of the compensation means to the third compression means, the second input terminal of the compensation means to the second output of the matrixing means, the third input terminal of the compensation means to the first output of the matrixing means, and the output terminal of the compensation means to the input of the second compression means, and for decoupling the compensation means in a third mode.

13. A transmitter for transmitting a first and a second main signal component and at least one auxiliary signal component via a transmission medium, characterized in that the transmitter comprises at least three input terminals for receiving the at least three signal components, multiplexer means having at least a first, a second and a third input coupled to the at least three input terminals, at least a first, a second and a third output and a control signal input for receiving a control signal, first compression means having an input coupled to the at least third output of the multiplexer means, the first compression means being adapted to carry out a data reduction step on the signal component applied to its input in response to a first masking control signal and to supply a first data compressed signal component to an output, masking control signal generator means for generating the first masking control signal for the first compression means, the masking control signal generator means being adapted to derive the masking control signal from the signal component applied to the input of the first compression means, first expansion means having an input and an output, the input being coupled to the first compression means, the expansion means being adapted to carry out an expansion on the signal applied to its input so as to obtain a replica of the signal component applied to the input of the first compression means and to supply the replica to its output, matrixing means having at least a first, a second and a third input, the first and second input being coupled to the first and second output respectively of the multiplexer means, and the third input being coupled to the output of the expansion means, the matrixing means having a first and a second output for supplying a first and a second output signal, the matrixing means being adapted to combine the first main signal component and the at least one auxiliary component so as to obtain the first output signal, and being adapted to combine the second main signal component and the at least one auxiliary signal component so as to obtain the second output signal, second and third compression means, each having an input coupled to the first and second output respectively of the matrixing means, and an output, the compression means being adapted to carry out a data reduction step on the signals applied to its inputs in response to second and third masking control signals and to supply data compressed first and second output signals to their outputs, second masking control signal generator means being adapted to generate the second masking control signal for the second compression means, and being adapted to generate the third masking control signal for the third compression means, the second masking control signal generator means being adapted to derive the second masking control signal from the signal component that is applied to the first input of the matrixing means and being adapted to derive the third masking control signal from the signal component that is applied to second input of the matrixing means, instruction signal generator means for generating at least first, second and third instruction signals, the first instruction signal being generated for enabling an expansion in a receiver on the data reduced output signal of the first compression means so as to obtain a replica of the signal component applied to the input of the first compression means, the second instruction signal being generated for enabling an expansion in the receiver on the data reduced output signal of the second compression means so as to obtain a replica of the first output signal of the matrixing means, the third instruction signal being generated for enabling an expansion in the receiver on the data reduced output signal of the third compression means so as to obtain a replica of the second output signal of the matrixing means, control signal generator means for generating the control signal for the multiplexer means, signal combination means for combining the output signals of the first, second and third compression means, the control signal as well as the first, second and third instruction signals so as to enable the transmission of those signals, and that the transmitter comprises the compensation means of claim 10.

14. A transmitter as claimed in claim 1, characterized in that the transmitter is in the form of an arrangement for recording the output signal of the signal combination means on a record carrier.

15. A record carrier obtained by the transmitter as claimed in claim 14, comprising the output signal of the signal combination means recorded in the track, the said output signal comprising the at least one control signal.

16. A receiver for receiving at least a first and a second main signal component that have been transmitted via a transmission medium by a transmitter, characterized in that the receiver comprises demultiplexer means for retrieving first and second instruction signals, compressed first and second signals and a control signal from an information signal received from the transmission medium, and for supplying the instruction signals and the first and second signals to expansion means having at least two outputs, the expansion means being adapted to carry out a data expansion on the first compressed signal in response to the first instruction signal so as to obtain a replica of an original uncompressed first signal and to supply the replica to a first one of said at least two outputs, to carry out a data expansion on the second compressed signal in response to the second instruction signal so as to obtain a replica of an original uncompressed second signal and to supply the replica to the second one of said at least two outputs, dematrixing means having at least a first and a second input coupled to the at least first and second output respectively of said expansion means and having at least one output, the dematrixing means being adapted to combine the signals applied to its inputs so as to obtain M subsignals corresponding to an output signal at its at least one output, switching means having a control signal input for receiving the control signal, the switching means being adapted to receive the output signal of the matrixing means and one of the output signals of the expansion means and being adapted to supply either the m-th subsignal of the output signal of the dematrixing means to a first output, or the m-th subsignal of the said one output signal of the expansion means to said first output in response to said control signal, first reconversion means having an input coupled to the first output of the switching means and an output coupled to a first output terminal for supplying the replica of the first main signal component, where m is an integer.

17. Receiver as claimed in claim 16, characterized in that the switching means are further adapted to supply either the n-th subsignal of the said one output signal of the expansion means to said first output, or the n-th subsignal of the output signal of the dematrixing means to said first output in response to said control signal, where n is an integer unequal to m.

18. Receiver as claimed in claim 16, characterized in that the switching means are adapted to supply either the M subsignals of the output signal of the dematrixing means to said first output, or the M subsignals of said one output signal of the expansion means to said first output in response to said control signal.

19. Receiver as claimed in claim 16, characterized in that the switching means are further adapted to supply either the m-th subsignal of the said one output signal of the expansion means to a second output, or the m-th subsignal of the output signal of the dematrixing means to said second output in response to said control signal, the receiver further comprising second reconversion means having an input coupled to the second output of the switching means and an output coupled to a second output terminal for supplying the replica of the second main signal component.

20. Receiver as claimed in claim 19, characterized in that the switching means are further adapted to supply either the n-th subsignal of said one output signal of the expansion means to said second output, or the n-th subsignal of the output signal of the dematrixing means to said second output in response to said control signal, where n is an integer unequal to m.

21. Receiver as claimed in claim 19, characterized in that the switching means are adapted to supply either the M subsignals of the said one output signal of the expansion means to said second output, or the M subsignals of the output signal of the dematrixing means to said second output in response to said control signal.

22. A receiver for receiving a first and a second main signal component and at least a first auxiliary signal component that have been transmitted via a transmission medium by a transmitter, characterized in that the receiver comprises demultiplexer means for retrieving first, second and third instruction signals and compressed first, second and third signals from an information signal received from the transmission medium, and for supplying said signals to expansion means having at least three outputs, the expansion means being adapted to carry out a data expansion on the first compressed signal in response to the first instruction signal so as to obtain a replica of the original uncompressed first signal and to supply the replica to a first one of said at least three outputs, to carry out a data expansion on the second compressed signal in response to the second instruction signal so as to obtain a replica of the original uncompressed second signal and to supply the replica to the second one of said at least three outputs, to carry out a data expansion on the third compressed signal in response to the third instruction signal so as to obtain a replica of the original uncompressed third signal and to supply the replica to the third one of said at least three outputs, dematrixing and switching means having at least a first, second and a third input coupled to the at least first, second and third output respectively of said expansion means and having at least three outputs, the dematrixing and switching means being adapted to combine the signals applied to its inputs so as to obtain M subsignals corresponding to the first main signal component at its first output, M subsignals corresponding to the second main signal component at its second output and M subsignals corresponding to the at least first auxiliary signal component at its at least third output, first reconversion means having an input coupled to the first output of the dematrixing and switching means and an output coupled to a first output terminal for supplying the replica of the first main signal component, second reconversion means having an input coupled to the second output of the dematrixing and switching means and an output coupled to a second output terminal for supplying the replica of the second main signal component, at least a third reconversion means having an input coupled to the third output of the dematrixing and switching means and an output coupled to a third output terminal for supplying the replica of the at least first auxiliary signal component.

23. A receiver as claimed in claim 22, characterized in that the demultiplexer means is further adapted to retrieve at least the first, second third control signals from the information signal received from the transmission medium, and to supply said control signals to an output, the said output being coupled to a control signal input of the dematrixing and switching means.

24. A receiver as claimed in claim 22, for receiving a first and a second main signal component and at least a first and a second auxiliary signal component, that have been transmitted via the transmission medium by the transmitter, the demultiplexer means further being adapted to retrieve at least a fourth compressed signal and at least a fourth instruction signal from the information signal received from the transmission medium, and to supply said fourth compressed signal to a fourth output, the said fourth output being coupled to a fourth input of the expansion means, the expansion means being adapted to carry out a data expansion on the fourth compressed signal in response to the fourth instruction signal so as to obtain a replica of the original uncompressed fourth signal and to supply the replica to a fourth output, the dematrixing and switching means further having at least a fourth input coupled to the at least fourth output of said expansion means and having at least a fourth output, the dematrixing and switching means further being adapted to combine the signals applied to its inputs so as to obtain M subsignals corresponding to the at least second auxiliary signal component at its fourth output, fourth reconversion means having an input coupled to the fourth output of the dematrixing and switching means and an output coupled to a fourth output terminal for supplying the replica of the second auxiliary signal component.

25. A receiver as claimed in claim 22, characterized in that the receiver is in the form of an arrangement for reproducing the first and second main signal component and the at least one auxiliary signal component from a record carrier.

* * * * *